(12) United States Patent
Deguchi et al.

(10) Patent No.: US 8,075,974 B2
(45) Date of Patent: Dec. 13, 2011

(54) OPTICAL RECORDING MEDIUM

(75) Inventors: Hiroshi Deguchi, Yokohama (JP); Eiko Hibino, Yokohama (JP); Hiroko Ohkura, Sagamihara (JP); Kazunori Ito, Yokohama (JP); Hajime Yuzurihara, Odawara (JP); Hiroyuki Iwasa, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 614 days.

(21) Appl. No.: 12/281,838

(22) PCT Filed: Mar. 2, 2007

(86) PCT No.: PCT/JP2007/054735
§ 371 (c)(1),
(2), (4) Date: Sep. 5, 2008

(87) PCT Pub. No.: WO2007/105662
PCT Pub. Date: Sep. 20, 2007

(65) Prior Publication Data
US 2009/0029091 A1    Jan. 29, 2009

(30) Foreign Application Priority Data

| Mar. 10, 2006 | (JP) | 2006-065812 |
| Mar. 13, 2006 | (JP) | 2006-067227 |
| Apr. 5, 2006 | (JP) | 2006-104583 |
| May 30, 2006 | (JP) | 2006-150403 |
| Jul. 27, 2006 | (JP) | 2006-205205 |
| Sep. 5, 2006 | (JP) | 2006-240251 |
| Sep. 19, 2006 | (JP) | 2006-252744 |
| Dec. 20, 2006 | (JP) | 2006-342442 |
| Dec. 20, 2006 | (JP) | 2006-342450 |
| Dec. 20, 2006 | (JP) | 2006-342623 |

(51) Int. Cl.
*B32B 3/02* (2006.01)
(52) U.S. Cl. ............ 428/64.1; 428/64.4; 428/64.5; 428/64.6; 430/270.13

(58) Field of Classification Search .......... 428/64.5; 430/270.13
See application file for complete search history.

(56) References Cited

U.S. PATENT DOCUMENTS
6,141,315 A    10/2000 Ebina et al.
(Continued)

FOREIGN PATENT DOCUMENTS
EP    1260973 A2    11/2002
(Continued)

OTHER PUBLICATIONS

Apr. 6, 2010 Japanese official action in counterpart Japanese patent application No. 2006-342450.

(Continued)

*Primary Examiner* — Elizabeth Mulvaney
(74) *Attorney, Agent, or Firm* — Cooper & Dunham LLP

(57) ABSTRACT

An optical recording medium having first protective layer, recording layer, second protective layer, and reflective layer, wherein the recording layer contains a phase-change material represented by Formula (1"1), Formula (1-2), or Formula (1-3); the second protective layer contains one selected from zinc oxides, indium oxides, tin oxides, mixtures thereof, and materials Formula (2), and materials Formula (3). Formula (1"1): $In_{\alpha 1}Sb_{\beta 1}X1_{\gamma 1}$ (X1: Ge, Te, Zn, Mn, or mixture thereof, $0.10 \leq \alpha 1 \leq 0.25$, $0.65 \leq \beta 1 \leq 0.80$, and $0.04 \leq \gamma 1 \leq 0.15$) Formula (1-2): $Ga_{\alpha 2}Sb_{\beta 2}Sn_{\gamma 2}Ge_{\varsigma 2}X2_{\in 2}$ (X2: Te, Zn, Mn, In, or mixture thereof, $0.04 \leq \alpha 2 \leq 0.09$, $0.56 \leq 62 \leq 0.79$, $0.05 \leq \gamma 2 < 0.30$, $0.03 \leq \delta 2 \leq 0.19$, and $0 \leq \in 2 \leq 0.09$) Formula (1-3): $Mn_{\alpha 3}Sb_{\beta 3}Sn_{\gamma 3}Ge_{\delta 3}X3_{\in 3}$ (X3: Te, In, Zn, Bi, or mixture thereof, $0.04 \leq \alpha 3 \leq 0.09$, $0.56 \leq 63 \leq 0.79$, $0.05 \leq \gamma 3 \leq 0.29$, $0.03 \leq \delta 3 \leq 0.23$, and $0 \leq \in 3 \leq 0.09$) Formula (2): ZnO—Al—Y [$(100-\alpha 4-64):\alpha 4:\beta 4$] (Y: Mn, Ge, Ti, or mixture thereof, $0.5 \leq \alpha 4 \leq 10.0$, and $0 \leq B4 \leq 25.0$) Formula (3): $ZnO-Al_2O_3-Z$ [$(100-\alpha 5-65):\alpha 5:\beta 5$] (Z: Mn oxide, Ge oxide, Ti oxide, or mixture thereof, $0.5 \leq \alpha 5 \leq 10.0$, and $0 \leq 65 \leq 30.0$).

12 Claims, 3 Drawing Sheets

Incoming Direction of Light

U.S. PATENT DOCUMENTS

| | | | |
|---|---|---|---|
| 6,723,410 B2 * | 4/2004 | Ohno et al. | 428/64.1 |
| 6,770,346 B2 * | 8/2004 | Harigaya et al. | 428/64.1 |
| 7,422,838 B1 | 9/2008 | Yamada et al. | |
| 2003/0012917 A1 | 1/2003 | Harigaya et al. | |
| 2005/0202200 A1 | 9/2005 | Ohno et al. | |
| 2005/0254410 A1 | 11/2005 | Kibe et al. | |
| 2006/0077884 A1 | 4/2006 | Ohkura et al. | |
| 2006/0228649 A1 | 10/2006 | Takada et al. | |
| 2006/0246270 A1 | 11/2006 | Takada et al. | |

FOREIGN PATENT DOCUMENTS

| | | |
|---|---|---|
| EP | 1607232 A1 | 12/2005 |
| JP | 3-52651 | 8/1991 |
| JP | 4-286683 | 10/1992 |
| JP | 5-101442 | 4/1993 |
| JP | 5-159362 | 6/1993 |
| JP | 5-208559 | 8/1993 |
| JP | 6-103609 | 4/1994 |
| JP | 2559803 | 9/1996 |
| JP | 11-185294 | 7/1999 |
| JP | 11-353707 | 12/1999 |
| JP | 2001-39031 | 2/2001 |
| JP | 2002-237095 | 8/2002 |
| JP | 2002-347341 | 12/2002 |
| JP | 3474714 | 9/2003 |
| JP | 2004-164849 | 6/2004 |
| JP | 2004-164850 | 6/2004 |
| JP | 2004-203011 | 7/2004 |
| JP | 2005-145061 | 6/2005 |
| JP | 2005-154820 | 6/2005 |
| JP | 2005-190642 | 7/2005 |
| JP | 2005-193663 | 7/2005 |
| JP | 2006-4558 | 1/2006 |
| TW | 428162 | 4/2001 |
| TW | 556180 | 10/2003 |
| WO | WO2004/079037 A1 | 9/2004 |
| WO | WO2004/085168 A1 | 10/2004 |
| WO | WO2005/031725 A1 | 4/2005 |
| WO | WO2005/051672 A1 | 6/2005 |
| WO | WO2005/075212 A1 | 8/2005 |
| WO | WO2006/009234 A1 | 1/2006 |

OTHER PUBLICATIONS

Apr. 6, 2010 Japanese official action in counterpart Japanese patent application No. 2006-342623.

Spruit, H., et al. "High-speed DVD+RW Recording", ISOM/ODS TuC 1, Jul. 2005.

Aug. 26, 2010 Taiwanese official action in connection with counterpart Taiwanese patent application.

Sep. 3, 2009 European search report in connection with a counterpart European patent application No. 07 73 8220.

* cited by examiner

Incoming Direction of Light

Incoming Direction of Light

OPTICAL RECORDING MEDIUM

TECHNICAL FIELD

This disclosure relates to a rewritable, phase-changeable optical recording medium using a phase-change material and relates in particular to technologies that enable high-speed recording and wide-range recording linear velocity; and for the improvement of recording sensitivity and storage reliability of an optical recording medium that enables recording including downward compatibility with DVDs at 8×-speed or more.

BACKGROUND ART

In recent years, an optical recording medium (hereinafter may be referred to as "phase-change optical disk", "optical disk", or "phase-changeable optical recording medium" having a recording layer composed of a phase-change material has been increasingly developed.

Generally, in a phase-change optical disk, a specific groove is formed on a transparent plastic substrate, and a thin film is formed on the groove. As a plastic material of a substrate, a polycarbonate resin is mainly used and an injection molding method may be used for forming a groove of the substrate. The thin film formed on the substrate has a multilayered structure in which a first protective layer, a recording layer, a second protective layer, and a reflective layer are basically formed in this order on the substrate.

The first protective layer and the second protective layer are respectively formed with an oxide, a nitride, a sulfide, and the like. Among these, $ZnS$—$SiO_2$, a mixture of $ZnS$ and $SiO_2$ are preferable.

For the recording layer, a phase-change material containing SbTe as the main component may be used. Specifically, examples of the phase-change material include Ge—Sb—Te, In—Sb—Te, Ag—In—Sb—Te, Ge—In—Sb—Te, Ge—Sn—Sb—Te, Ge—Te, In—Sb, Ga—Sb, and Ge—Sb.

For the reflective layer, metal materials may be used, however, from the viewpoint of optical properties and thermal conductivity, metal materials such as Al, Ag, Au, Cu, and an alloy thereof may be used. Besides, for the purpose of the improvement of various disk properties, a different layer called an insert layer or an interface layer can be formed in between the above-noted respective layers, or each layer itself can be formed with multiple layers. For forming each of these layers, various layer forming methods such as resistance wire heating method, electron beam evaporation method, sputtering method, CVD method can be used. Among these, the sputtering method is particularly preferable from the viewpoint of mass productivity.

After a multi-layered film of these layers is formed, the multi-layered film is coated with a resin layer by spin-coating to protect a thin film.

In a phase-change optical disk produced in this way, a phase-change material used in a recording layer is in an amorphous state, and the phase-change optical disk is generally subjected to a so-called initialization step in which the recording layer is crystallized. In a typical initialization method for initializing a phase-change optical disk, the disk is irradiated with laser beam from a semiconductor laser with a width of a several micrometers, a length of several tens micrometers to several hundreds micrometers while rotating a disk and moving the laser beam in the radius direction. In many cases, an optical disk is more efficiently irradiated with a laser beam by providing with a focusing function. In the initialized phase-change optical disk, arbitrary amorphous marks can be formed by irradiating the disk with a laser according to an arbitrarily predetermined light emission pattern (recording strategy). Besides, a phase-change optical disk can carry out erasing and recording simultaneously called direct overwrite (DOW) recording. Here, the erasing means crystallizing marks in amorphous state, and the recording means forming marks in amorphous state from crystallized marks.

Recording strategy includes ternary control (Pw>Pe>Pb) of recording power (Pw), erasing power (Pe), and bias power (Pb). By combining these and various pulse widths, marks having a specific mark length are recorded. For a modulation method for recording and reproducing data, there are EFM modulation in CDs and EFM+ modulation used in DVDs. Since these modulation methods employ a mark-edge recording mode, controlling a mark length is very important. Jitter property is generally used for evaluation of controlling the mark length.

These phase-change optical disks are used for CD-RW, DVD+RW, DVD-RW, DVD-RAM, and are widely used for audiovisual application and for recording information in computers. Recently, with high-volume of digital capacity, application of these phase-change optical disks to higher volume HD-DVD, Blu-Ray Disc has also been started. With an increase of such recording capacity, further high speed recording is expected as well.

The high speed recording means recording that can be achieved by primarily increasing the number of rotations of a disk and also means recording at a speed as fast as 8×-speed or more of standard linear velocity of DVDs and 28 m/s or more of linear velocity.

Furthermore, in view of practicality, an optical recording medium having compatibility with optical disk drive apparatuses that have been commercially available, so called downward compatibility, is preferable, and not only high-speed recording but also low speed recording are required.

As described above, GaSb based phase-change materials are known. Patent Literature 1 and 2 respectively disclose high linear velocity recording. However, since there is no specific description with regard to recordable linear velocity range in the Patent Literature mentioned above, these related arts can not achieve the purpose of the present invention that enables recording in a wide linear velocity range.

Under these circumstances, the present inventors experienced the phenomenon that the number of reproducing errors in a phase-change material suitable for high-speed recording was increased in a certain range of recording linear velocities. For example, a report similar to the phenomenon is described in Non Patent Literature 1.

Hereinafter, the description about the phenomenon found by the inventors of the present invention will be described below.

FIG. 1 shows the relation between recording linear velocities of a disk developed for recording DVD+RW 8×-speed and jitter property DOW 10 times recording and PI errors (Parity Inner Error:intra-coding parity error) property. In FIG. 1, horizontal scale represents recording linear velocity, left-side vertical scale represents PI errors, and right-side vertical scale represents DOW 10 Jitter. PI errors means the above-noted reproducing errors. Besides, for recording conditions, conditions under which the jitter property is optimum are used.

As can be seen from FIG. 1, the jitter property of the disk at a speed of 3× to 8× shows excellent results i.e. about 9% or less, whereas the number of PI errors is drastically increased in the range of 4×-speed to 7×-speed which are intermediate linear velocities. It is considered that when the number of PI errors is 280 or more, particularly 350 or more, it causes problems in practical use.

In FIG. 1 the number of PI errors far more than the above noted values are shown, and it is apparent that jitter property greatly inversely relates to error property. In FIG. 1, similar phenomena can be verified without depending on the number of DOW times, although the results vary to some extent.

In order to examine the detail of this phenomenon, for a disk used in FIG. 1, a single pattern that 3T mark and 3T space are aligned alternately is recorded using the recording strategy shown in FIG. 2. A pattern diagram of the recording mark shapes is given in FIG. 3A. Horizontal scale of FIG. 2 represents time, and vertical scale represents signal intensity. The shape of A mark shape is the observation result using a transmission electron microscope.

The mark A and the mark C in FIG. 3A are normal recording marks whereas the mark B is an abnormal mark in which crystal occurs within the mark.

FIG. 3B shows a reproducing signal of a recording mark. A dashed line is the case when a recording mark is normal, whereas when a recording mark has crystal like the mark B, a reproducing signal may be distorted like shown as a solid line. As a result, binarized signal is like the one in FIG. 3C, abnormal mark B with crystal is only reproduced as shorter than normal 3T mark. Here, only data of recording 3T single pattern is shown, and it is verified that this problem also occurs in other single patterns.

The results of such signal measured by TIA (Time Interval Analyzer) are given in FIG. 4 as a pattern diagram. FIG. 4 shows the distribution of the abnormal mark and the normal mark, horizontal scale represents a mark length and vertical scale (logarithmic axis) represents the number of marks.

As shown in FIG. 4, it can be divided into components showing a normal distribution centered on 3T and components which are distributed in regions shorter than 3T. The components distributed in the regions smaller than 3T correspond to the number of abnormal marks existing in recording marks, which will cause PI errors.

As examples that crystal affects amorphous marks, the following (1) to (3) are known.
(1) Partial recrystallization of marks by residual heat, also called cross erase is reported (see Patent Literature 3).
(2) It is reported that unerased marks are generated due to insufficient crystallization at high-speed recording (see Patent Literature 4).
(3) It is reported that crystals are deposited around amorphous marks in DOW recording multiple times (see Patent Literature 5 to Patent Literature 7).

It is found that the phenomenon is different from conventionally known phenomenon from the viewpoint that the phenomenon is does not depend on the number of DOW times, crystal is not generated in all the amorphous marks, the number of reproducing errors is significantly increased regardless of favorable jitter property, and crystal exists within marks, not around the marks.

Furthermore, as recording density increases to the extent of DVDs, it is thought that the existence of crystal as described above in recording mark leads to increases in reproducing errors, and it is expected that this may cause a significant problem in a phase-change optical disk using a blue laser which enables higher density recording.

The inventors further examined the phenomenon in which errors are increased in the intermediate linear velocity and found out that the phenomenon depends heavily on a crystallization rate of a phase-change material.

FIG. 5 shows the relation between crystallization rates of various phase-change materials and the number of abnormal marks of 3T mark. Horizontal scale in FIG. 5 represents a crystallization rate and vertical scale represents the number of abnormal marks.

The number of abnormal marks is the total obtained in the evaluation of TIA (Time Interval Analyzer) and is the standardized one that the number of abnormal marks existing in shorter areas than those of 3T. As can be seen from FIG. 5, the number of abnormal marks is increased in high-crystallization rate area bordered by a specific crystallization rate. For this reason, it is necessary to limit the crystallization rate to a value lower than a specific value in order to control abnormal marks.

Although Patent Literature 8 to 10 proposes the invention using $InSb_x$ as materials for a recording layer, there is neither disclosure nor indication about using any one of zinc oxide, indium oxide, tin oxide, and a mixture thereof as a protective layer material.

In Patent Literature 9, although there is a description with regard to standard clock frequency, recording conditions, the relation between recording linear velocity and recording density (the shortest mark length) is not clear.

Patent Literature 10 discloses that recording principle is changes induced between crystallized marks, however, there is neither disclosure nor indication about change induced between crystallized marks and amorphous marks.

Although Patent Literature 11 to 16 disclose that the main component of the second protective layer is at least one selected from zinc oxides, indium oxides, and tin oxides, there are the following problems.

In Patent Literature 11, there is no description about the composition with regard to the combination with $InSb_x$ so that the purpose of the present invention can not be accomplished.

In Patent Literature 12, there is only an indication about the composition of combining 2 kinds of protective layer materials so that the purpose of the present invention also can not be accomplished.

The invention described in Patent Literature 13 uses different recording layer materials and is a totally different technology from the composition of the present invention.

In Patent Literature 14 to 15, there is no description of composition with regard to the combination with $InSb_x$ so that the purpose of the present invention can not be accomplished.

In Patent Literature 16, there is no description of composition with regard to the combination with $InSb_x$ and the position of protective layer materials is different so that the purpose of the present invention can not be accomplished.

In order not only to resolve the above-noted issues but also to attain high-speed recording, it is necessary to make crystallization rate faster. The reason is generally thought as that if the crystallization rate is slower than the recording linear velocity, crystallization at the overwriting can not be fulfilled so that sufficient erasing can not be done.

For DVD+RW optical disks for 8×-speed recording, although low speed recording to 3.3×-speed is possible by optimizing a recording method and further employment of additional materials and layer structure, there is a problem that it is difficult to achieve wider recording linear velocities in consideration of further high speed recording and downward compatibility.

[Patent Literature 1] Japanese Patent Application Laid-Open (JP-A) No. 2005-145061

[Patent Literature 2] Japanese Patent Application Laid-Open (JP-A) No. 2004-203011

[Patent Literature 3] Japanese Patent Application Laid-Open (JP-A) No. 2004-164850

[Patent Literature 4] Japanese Patent Application Laid-Open (JP-A) No. 2004-164849
[Patent Literature 5] Japanese Patent Application Laid-Open (JP-A) No. 4-286683
[Patent Literature 6] Japanese Patent Application Laid-Open (JP-A) No. 6-103609
[Patent Literature 7] Japanese Patent (JP-B) No. 3474714
[Patent Literature 8] Japanese Patent Application Laid-Open (JP-A) No. 2005-193663
[Patent Literature 9] Japanese Patent Application Laid-Open (JP-A) No. 2002-347341
[Patent Literature 10] Japanese Patent Application Publication (JP-B) No. 3-52651
[Patent Literature 11] Japanese Patent Application Laid-Open (JP-A) No. 2005-190642
[Patent Literature 12] Japanese Patent Application Laid-Open (JP-A) No. 5-101442
[Patent Literature 13] Japanese Patent (JP-B) No. 2559803
[Patent Literature 14] Japanese Patent Application Laid-Open (JP-A) No. 5-159362
[Patent Literature 15] Japanese Patent Application Laid-Open (JP-A) No. 11-185294
[Patent Literature 16] Japanese Patent Application Laid-Open (JP-A) No. 5-208559
[Non Patent Literature 1] H. Spruit et al.: High Speed DVD+RW Recording, ISOM/ODS'05 Tech. Dig. (2005) TuC1

DISCLOSURE OF INVENTION SUMMARY

In an aspect of this disclose, there is provided a phase-changeable optical recording medium capable of preventing abnormal mark occurrence, allowing high speed recording of 8×-speed or more of the standard linear velocity of DVDs, and obtaining favorable results on both jitter property and reproducing error property in a wide range of recording linear velocities.

Various other aspects and features may be provided, such as, for example, the following:

The means for solving the above-noted problems are as follows.

<1> An optical recording medium including: a first protective layer, a recording layer, a second protective layer, and a reflective layer formed in this order as viewed from the side of laser beam irradiation for recording and reproducing, wherein the recording layer contains a phase-change material represented by any one of the following Composition Formula (1-1), Composition Formula (1-2), and Composition Formula (1-3); and the second protective layer contains at least one selected from zinc oxides, indium oxides, tin oxides, and mixtures thereof, a material represented by the following Composition Formula (2), and a material represented by the following Composition Formula (3), $$In_{\alpha 1}Sb_{\beta 1}X1_{\gamma 1} \qquad \text{Composition Formula (1-1)}$$

where X1 is at least one selected from Ge, Te, Zn, and Mn; α1, β1, and γ1 respectively represent an atomic ratio, where $0.10 \leq \alpha 1 \leq 0.25$, $0.65 \leq \beta 1 \leq 0.80$, and $0.04 \leq \gamma 1 \leq 0.15$, $$Ga_{\alpha 2}Sb_{\beta 2}Sn_{\gamma 2}Ge_{\delta 2}X2_{\in 2} \qquad \text{Composition Formula (1-2)}$$

where X2 is at least one selected from Te, Zn, Mn, and In; α2, β2, γ2, δ2, and ∈2 respectively represent an atomic ratio, where $0.04 \leq \alpha 2 \leq 0.09$, $0.56 \leq \beta 2 \leq 0.79$, $0.05 \leq \gamma 2 \leq 0.30$, $0.03 \leq \delta 2 \leq 0.19$, and $0 \leq \in 2 \leq 0.09$, $$Mn_{\alpha 3}Sb_{\beta 3}Sn_{\gamma 3}Ge_{\delta 3}X3_{\in 3} \qquad \text{Composition Formula (1-3)}$$

where X3 is at least one selected from Te, In, Zn, and Bi; α3, β3, γ3, δ3, and ∈3 respectively represent an atomic ratio, where $0.04 \leq \alpha 3 \leq 0.09$, $0.56 \leq \beta 3 \leq 0.79$, $0.05 \leq \gamma 3 \leq 0.29$, $0.03 \leq \delta 3 \leq 0.23$, and $0 \leq \in 3 \leq 0.09$, $$ZnO-Al-Y[(100-\alpha 4-\beta 4):\alpha 4:\beta 4] \qquad \text{Composition Formula (2)}$$

where Y is at least one selected from Mn, Ge, and Ti; α4 and β4 respectively represent a percent by mass, where $0.5 \leq \alpha 4 \leq 10.0$, and $0 \leq \beta 4 \leq 25.0$, $$ZnO-Al_2O_3-Z[(100-\alpha 5-\beta 5):\alpha 5:\beta 5] \qquad \text{Composition Formula (3)}$$

where Z represents any one of an Mn oxide, a Ge oxide, a Ti oxide, and a mixture thereof; α5 and β5 respectively represent a percent by mass, where $0.5 \leq \alpha 5 \leq 10.0$, and $0 \leq \beta 5 \leq 30.0$.

<2> The optical recording medium according to <1>, further including a transparent substrate, and at least the first protective layer, the recording layer, the second protective layer and the reflective layer formed in this order on the transparent substrate as viewed from the side of laser beam irradiation for recording and reproducing.

<3> The optical recording medium according to <1>, further including a transparent cover layer, wherein the transparent cover layer, the first protective layer, the recording layer, the second protective layer, and the reflective layer are formed in this order on the substrate as viewed from the side of laser beam irradiation for recording and reproducing.

<4> The optical recording medium according to any one of <1> to <3>, wherein the recording layer contains a phase-change material represented by the following Composition Formula (1-1); and the second protective layer comprises at least one selected from zinc oxides, indium oxides, tin oxides, and mixtures thereof, $$In_{\alpha 1}Sb_{\beta 1}X1_{\gamma 1} \qquad \text{Composition Formula (1-1)}$$

where X1 is at least one selected from Ge, Te, Zn, and Mn; α1, β1, and γ1 respectively represent an atomic ratio, where $0.10 \leq \alpha 1 \leq 0.25$, $0.65 \leq \beta 1 \leq 0.80$, and $0.04 \leq \gamma 1 \leq 0.15$.

<5> The optical recording medium according to any one of <1> to <3>, wherein the recording layer contains a phase-change material represented by the following Composition Formula (1-1); and the second protective layer contains a material represented by the following Composition Formula (2), $$In_{\alpha 1}Sb_{\beta 1}X1_{\gamma 1} \qquad \text{Composition Formula (1-1)}$$

where X1 is at least one selected from Ge, Te, Zn, and Mn; α1, β1, and γ1 respectively represent an atomic ratio, where $0.10 \leq \alpha 1 \leq 0.25$, $0.65 \leq \beta 1 \leq 0.80$, and $0.04 \leq \gamma 1 \leq 0.15$, $$ZnO-Al-Y[(100-\alpha 4-\beta 4):\alpha 4:\beta 4] \qquad \text{Composition Formula (2)}$$

where Y is at least one selected from Mn, Ge, and Ti; α4 and β4 respectively represent a percent by mass, where $0.5 \leq \alpha 4 \leq 10.0$, and $0 \leq \beta 4 \leq 25.0$.

<6> The optical recording medium according to any one of <1> to <3>, wherein the recording layer contains a phase-change material represented by the following Composition Formula (1-1) and the second protective layer contains a material represented by the following Composition Formula (3), $$In_{\alpha 1}Sb_{\beta 1}X1_{\gamma 1} \qquad \text{Composition Formula (1-1)}$$

where X1 is at least one selected from Ge, Te, Zn, and Mn; α1, β1, and γ1 respectively represent an atomic ratio, where $0.10 \leq \alpha 1 \leq 0.25$, $0.65 \leq \beta 1 \leq 0.80$, and $0.04 \leq \gamma 1 \leq 0.15$, $$ZnO-Al_2O_3-Z[(100-\alpha 5-\beta 5):\alpha 5:\beta 5] \qquad \text{Composition Formula (3)}$$

where Z represents any one of an Mn oxide, a Ge oxide, a Ti oxide, and a mixture thereof; α5 and β5 respectively represent a percent by mass, where $0.5 \leq \alpha5 \leq 10.0$, and $0 \leq \beta5 \leq 30.0$.

<7> The optical recording medium according to any one of <1> to <3>, wherein the recording layer contains a phase-change material represented by the following Composition Formula (1-2); and the second protective layer contains at least one selected from zinc oxides, indium oxides, tin oxides, and mixtures thereof,

$$Ga_{\alpha2}Sb_{\beta2}Sn_{\gamma2}Ge_{\delta2}X2_{\in2} \quad \text{Composition Formula (1-2)}$$

where X2 is at least one selected from Te, Zn, Mn, and In; α2, β2, γ2, δ2, and ∈2 respectively represent an atomic ratio, where $0.04 \leq \alpha2 \leq 0.09$, $0.56 \leq \beta2 \leq 0.79$, $0.05 \leq \gamma2 \leq 0.30$, $0.03 \leq \delta2 \leq 0.19$, and $0 \leq \in2 \leq 0.09$.

<8> The optical recording medium according to any one of <1> to <3>, wherein the recording layer contains a phase-change material represented by the following Composition Formula (1-2); and the second protective layer contains a material represented by the following Composition Formula (2),

$$Ga_{\alpha2}Sb_{\beta2}Sn_{\gamma2}Ge_{\delta2}X2_{\in2} \quad \text{Composition Formula (1-2)}$$

where X2 is at least one selected from Te, Zn, Mn, and In; α2, β2, γ2, δ2, and ∈2 respectively represent an atomic ratio, where $0.04 \leq \alpha2 \leq 0.09$, $0.56 \leq \beta2 \leq 0.79$, $0.05 \leq \gamma2 \leq 0.30$, $0.03 \leq \delta2 \leq 0.19$, and $0 \leq \in2 \leq 0.09$,

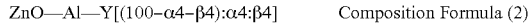
$$ZnO\text{—}Al\text{—}Y[(100-\alpha4-\beta4):\alpha4:\beta4] \quad \text{Composition Formula (2)}$$

where Y is at least one selected from Mn, Ge, and Ti; α4 and β4 respectively represent a percent by mass, where $0.5 \leq \alpha4 \leq 10.0$, and $0 \leq \beta4 \leq 25.0$.

<9> The optical recording medium according to any one of <1> to <3>, wherein the recording layer contains a phase-change material represented by the following Composition Formula (1-2); and the second protective layer contains a material represented by the following Composition Formula (3),

$$Ga_{\alpha2}Sb_{\beta2}Sn_{\gamma2}Ge_{\delta2}X2_{\in2} \quad \text{Composition Formula (1-2)}$$

where X2 is at least one selected from Te, Zn, Mn, and In; α2, β2, γ2, δ2, and ∈2 respectively represent an atomic ratio, where $0.04 \leq \alpha2 \leq 0.09$, $0.56 \leq \beta2 \leq 0.79$, $0.05 \leq \gamma2 \leq 0.30$, $0.03 \leq \delta2 \leq 0.19$, and $0 \leq \in2 \leq 0.09$,

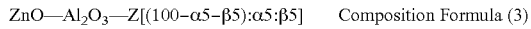
$$ZnO\text{—}Al_2O_3\text{—}Z[(100-\alpha5-\beta5):\alpha5:\beta5] \quad \text{Composition Formula (3)}$$

where Z represents any one of an Mn oxide, a Ge oxide, a Ti oxide, and a mixture thereof; α5 and β5 respectively represent a percent by mass, where $0.5 \leq \alpha5 \leq 10.0$, and $0 \leq \beta5 \leq 30.0$.

<10> The optical recording medium according to any one of <1> to <3>, wherein the recording layer contains a phase-change material represented by the following Composition Formula (1-3); and the second protective layer contains at least one selected from zinc oxides, indium oxides, tin oxides, and mixtures thereof,

$$Mn_{\alpha3}Sb_{\beta3}Sn_{\gamma3}Ge_{\delta3}X3_{\in3} \quad \text{Composition Formula (1-3)}$$

where X3 is at least one selected from Te, In, Zn, and Bi; α3, β3, γ3, δ3, and ∈3 respectively represent an atomic ratio, where $0.04 \leq \alpha3 \leq 0.09$, $0.56 \leq \beta3 \leq 0.79$, $0.05 \leq \gamma3 \leq 0.29$, $0.03 \leq \delta3 \leq 0.23$, and $0 \leq \in3 \leq 0.09$.

<11> The optical recording medium according to any one of <1> to <3>, wherein the recording layer contains a phase-change material represented by the following Composition Formula (1-3); and the second protective layer contains a material represented by the following Composition Formula (2),

$$Mn_{\alpha3}Sb_{\beta3}Sn_{\gamma3}Ge_{\delta3}X3_{\in3} \quad \text{Composition Formula (1-3)}$$

where X3 is at least one selected from Te, In, Zn, and Bi; α3, β3, γ3, δ3, and ∈3 respectively represent an atomic ratio, where $0.04 \leq \alpha3 \leq 0.09$, $0.56 \leq \beta3 \leq 0.79$, $0.05 \leq \gamma3 \leq 0.29$, $0.03 \leq \delta3 \leq 0.23$, and $0 \leq \in3 \leq 0.09$,

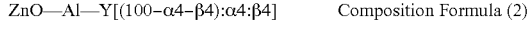
$$ZnO\text{—}Al\text{—}Y[(100-\alpha4-\beta4):\alpha4:\beta4] \quad \text{Composition Formula (2)}$$

where Y is at least one selected from Mn, Ge, and Ti; α4 and β4 respectively represent a percent by mass, where $0.5 \leq \alpha4 \leq 10.0$, and $0 \leq \beta4 \leq 25.0$.

<12> The optical recording medium according to any one of <1> to <3>, wherein the recording layer contains a phase-change material represented by the following Composition Formula (1-3); and the second protective layer contains a material represented by the following Composition Formula (3),

$$Mn_{\alpha3}Sb_{\beta3}Sn_{\gamma3}Ge_{\delta3}X3_{\in3} \quad \text{Composition Formula (1-3)}$$

where X3 is at least one selected from Te, In, Zn, and Bi; α3, β3, γ3, δ3, and ∈3 respectively represent an atomic ratio, where $0.04 \leq \alpha3 \leq 0.09$, $0.56 \leq \beta3 \leq 0.79$, $0.05 \leq \gamma3 \leq 0.29$, $0.03 \leq \delta3 \leq 0.23$, and $0 \leq \in3 \leq 0.09$,

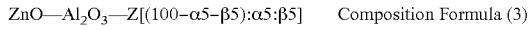
$$ZnO\text{—}Al_2O_3\text{—}Z[(100-\alpha5-\beta5):\alpha5:\beta5] \quad \text{Composition Formula (3)}$$

where Z represents any one of an Mn oxide, a Ge oxide, a Ti oxide, and a mixture thereof; α5 and β5 respectively represent a percent by mass, where $0.5 \leq \alpha5 \leq 10.0$, and $0 \leq \beta5 \leq 30.0$.

<13> The optical recording medium according to any one of <1> to <12>, wherein electric resistivity of the second protective layer is $1.0 \times 10^{-4}$ Ω·cm to $1.0 \times 10^{1}$ Ω·cm.

<14> The optical recording medium according to any one of <1> to <13>, wherein the maximum recording linear velocity is 30 m/s to 56 m/s and the minimum recording linear velocity is 10 m/s to 14 m/s.

<15> The optical recording medium according to any one of <1> to <14>, wherein the shortest recording mark length is 0.5 μm or less.

BEST MODE FOR CARRYING OUT THE INVENTION

Figure 1:
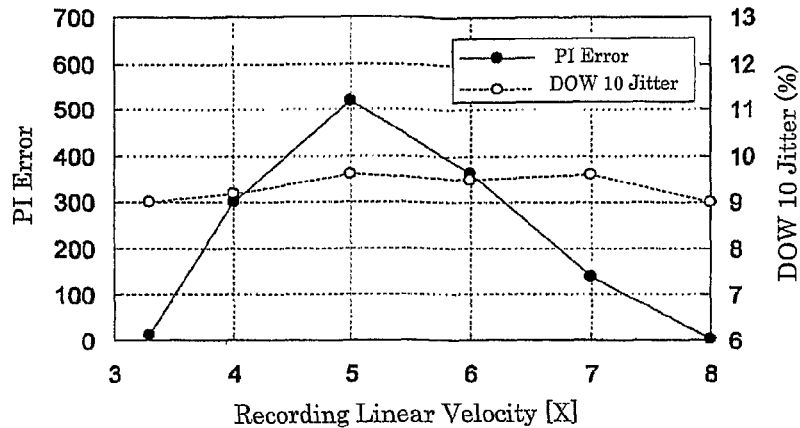
FIG. 1 is an explanatory diagram showing recording linear velocity of disks for 8×-speed recording and the relation between jitter property at DOW 10 recording and PI Error property.
Figure 2:
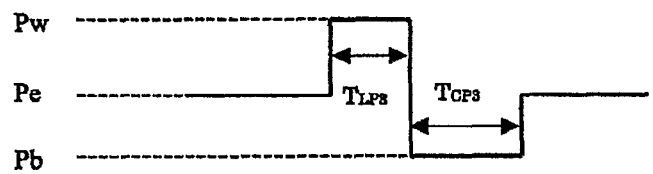
FIG. 2 is a single pattern view of recording strategy that 3T mark and 3T space are alternate arrangement.
Figure 3A:
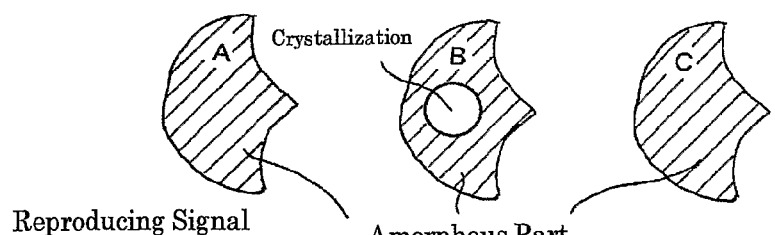
FIG. 3A is a plan view showing a relation between a mark shape and a reproducing signal when an abnormal mark is generated in a recording mark and showing shapes of a recording mark.
Figure 3B:
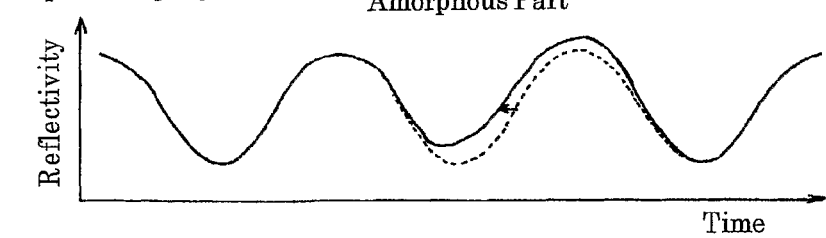
FIG. 3B is a graph showing a relation between mark shapes and a reproducing signal when an abnormal mark is generated in a recording mark, and showing the reproducing signal.
Figure 3C:
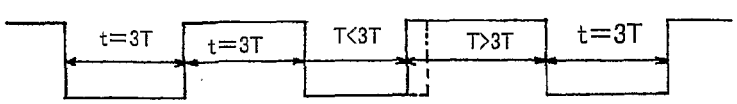
FIG. 3C is a pattern view showing a relation between a mark shape and a reproducing signal when an abnormal mark is generated in a recording mark, and showing a binary signal.
Figure 4:
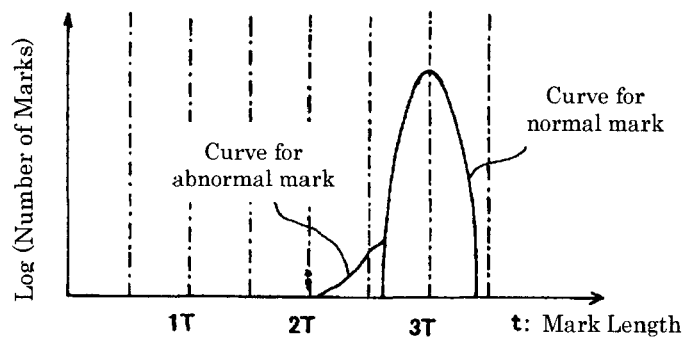
FIG. 4 is a graph showing a distribution of abnormal marks and normal marks of recording marks.
Figure 5:
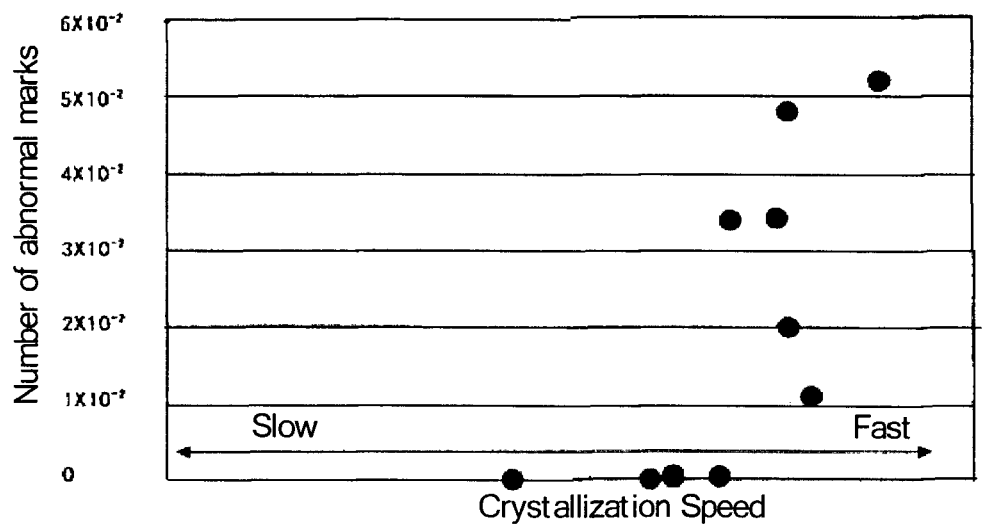
FIG. 5 is an explanatory diagram showing a relation between crystallization rates of various a phase-change material and the number of abnormal marks in 3T mark.

An optical recording medium of the present invention is sequentially composed of at least a first protective layer, a recording layer, a second protective layer, a reflective layer, and other layers as necessary from the direction of the incoming light for recording.

As the optical recording medium, (1) a mode having a transparent substrate and at least a first protective layer, a recording layer, a second protective layer, and a reflective layer formed in this order as viewed from the side of laser beam irradiation for recording and reproducing on the transparent substrate, and (2) a mode having a transparent cover layer, a first protective layer, a recording layer, a second protective layer, and a reflective layer formed in this order as viewed from the side of laser beam irradiation for recording and reproducing on the substrate are preferable.

The recording layer includes a phase-change material represented any one of the following Composition Formula (1-1), Composition Formula (1-2), and Composition Formula (1-3), and the second protective layer includes at least one selected from zinc oxides, indium oxides, tin oxides, mixtures thereof, materials represented by the following Composition Formula (2), and materials represented by the following Composition Formula (3), $$In_{\alpha 1}Sb_{\beta 1}X1_{\gamma 1} \qquad \text{Composition Formula (1-1)}$$

where X1 is at least one selected from Ge, Te, Zn, and Mn; α1, β1, and γ1 respectively represent an atomic ratio, where $0.10 \leq \alpha 1 \leq 0.25$, $0.65 \leq \beta 1 \leq 0.80$, and $0.04 \leq \gamma 1 \leq 0.15$, $$Ga_{\alpha 2}Sb_{\beta 2}Sn_{\gamma 2}Ge_{\delta 2}X2_{\in 2} \qquad \text{Composition Formula (1-2)}$$

where X2 is at least one selected from Te, Zn, Mn, and In; α2, β2, γ2, δ2, and ∈2 respectively represent an atomic ratio, where $0.04 \leq \alpha 2 \leq 0.09$, $0.56 \leq \beta 2 \leq 0.79$, $0.05 \leq \gamma 2 \leq 0.30$, $0.03 \leq \delta 2 \leq 0.19$, and $0 \leq \in 2 \leq 0.09$, $$Mn_{\alpha 3}Sb_{\beta 3}Sn_{\gamma 3}Ge_{\delta 3}X3_{\in 3} \qquad \text{Composition Formula (1-3)}$$

where X3 is at least one selected from Te, In, Zn, and Bi; α3, β3, γ3, δ3, and ∈3 respectively represent an atomic ratio, where $0.04 \leq \alpha 3 \leq 0.09$, $0.56 \leq \beta 3 \leq 0.79$, $0.05 \leq \gamma 3 \leq 0.29$, $0.03 \leq \delta 3 \leq 0.29$, $0.03 \leq \delta 3 \leq 0.23$, and $0 \leq \in 3 \leq 0.09$, $$ZnO\text{—}Al\text{—}Y[(100-\alpha 4-\beta 4):\alpha 4:\beta 4] \qquad \text{Composition Formula (2)}$$

where Y is at least one selected from Mn, Ge, and Ti; α4 and β4 respectively represent a percent by mass, where $0.5 \leq \alpha 4 \leq 10.0$, and $0 \leq \beta 4 \leq 25.0$, $$ZnO\text{—}Al_2O_3\text{—}Z[(100-\alpha 5-\beta 5):\alpha 5:\beta 5] \qquad \text{Composition Formula (3)}$$

where Z represents any one of an Mn oxide, a Ge oxide, a Ti oxide, and a mixture thereof; α5 and β5 respectively represent a percent by mass, where $0.5 \leq \alpha 5 \leq 10.0$, and $0 \leq \beta 5 \leq 30.0$.

An optical recording medium of the present invention is preferably any one of the following first to ninth mode.

In the first mode, a recording layer includes a phase-change material represented by the following Composition Formula (1-1), and a second protective layer includes at least one selected from zinc oxides, indium oxides, tin oxides, and mixtures thereof.

$$In_{\alpha 1}Sb_{\beta 1}X1_{\gamma 1} \qquad \text{Composition Formula (1-1)}$$

where X1 is at least one selected from Ge, Te, Zn, and Mn; α1, β1, and γ1 respectively represent an atomic ratio, where $0.10 \leq \alpha 1 \leq 0.25$, $0.65 \leq \beta 1 \leq 0.80$, and $0.04 \leq \gamma 1 \leq 0.15$.

In the second mode, a recording layer includes a phase-change material represented by the following Composition Formula (1-1), and the second protective layer includes a material represented by the following Composition Formula (2), $$In_{\alpha 1}Sb_{\beta 1}X1_{\gamma 1} \qquad \text{Composition Formula (1-1)}$$

where X1 is at least one selected from Ge, Te, Zn, and Mn; α1, β1, and γ1 respectively represent an atomic ratio, where $0.10 \leq \alpha 1 \leq 0.25$, $0.65 \leq \beta 1 \leq 0.80$, and $0.04 \leq \gamma 1 \leq 0.15$, $$ZnO\text{—}Al\text{—}Y[(100-\alpha 4-\beta 4):\alpha 4:\beta 4] \qquad \text{Composition Formula (2)}$$

where Y is at least one selected from Mn, Ge, and Ti; α4 and β4 respectively represent a percent by mass, where $0.5 \leq \alpha 4 \leq 10.0$, and $0 \leq \beta 4 \leq 25.0$.

In the third mode, a recording layer includes a phase-change material represented by the following Composition Formula (1-1), and a second protective layer includes a material represented by the following Composition Formula (3), $$In_{\alpha 1}Sb_{\beta 1}X1_{\gamma 1} \qquad \text{Composition Formula (1-1)}$$

where X1 is at least one selected from Ge, Te, Zn, and Mn; α1, β1, and γ1 respectively represent an atomic ratio, where $0.10 \leq \alpha 1 \leq 0.25$, $0.65 \leq \beta 1 \leq 0.80$, and $0.04 \leq \gamma 1 \leq 0.15$, $$ZnO\text{—}Al_2O_3\text{—}Z[(100-\alpha 5-\beta 5):\alpha 5:\beta 5] \qquad \text{Composition Formula (3)}$$

where Z represents any one of an Mn oxide, a Ge oxide, a Ti oxide, and a mixture thereof; α5 and β5 respectively represent a percent by mass, where $0.5 \leq \alpha 5 \leq 10.0$, and $0 \leq \beta 5 \leq 30.0$.

In the fourth mode, a recording layer includes a phase-change material represented by the following Composition Formula (1-2), and the second protective layer includes at least one selected from zinc oxides, indium oxides, tin oxides, and mixtures thereof.

$$Ga_{\alpha 2}Sb_{\beta 2}Sn_{\gamma 2}Ge_{\delta 2}X2_{\in 2} \qquad \text{Composition Formula (1-2)}$$

where X2 is at least one selected from Te, Zn, Mn, and In; α2, β2, γ2, δ2, and ∈2 respectively represent an atomic ratio, where $0.04 \leq \alpha 2 \leq 0.09$, $0.56 \leq \beta 2 \leq 0.79$, $0.05 \leq \gamma 2 \leq 0.30$, $0.03 \leq \delta 2 \leq 0.19$, and $0 \leq \in 2 \leq 0.09$.

In the fifth mode, a recording layer includes a phase-change material represented by the following Composition Formula (1-2), and a second protective layer includes a material represented by the following Composition Formula (2), $$Ga_{\alpha 2}Sb_{\beta 2}Sn_{\gamma 2}Ge_{\delta 2}X2_{\in 2} \qquad \text{Composition Formula (1-2)}$$

where X2 is at least one selected from Te, Zn, Mn, and In; α2, β2, γ2, δ2, and ∈2 respectively represent an atomic ratio, where, $0.04 \leq \alpha 2 \leq 0.09$, $0.56 \leq \beta 2 \leq 0.79$, $0.05 \leq \gamma 2 \leq 0.30$, $0.03 \leq \delta 2 \leq 0.19$, and $0 \leq \in 2 \leq 0.09$, $$ZnO\text{—}Al\text{—}Y[(100-\alpha 4-\beta 4):\alpha 4:\beta 4] \qquad \text{Composition Formula (2)}$$

where Y is at least one selected from Mn, Ge, and Ti; α4 and β4 respectively represent a percent by mass, where $0.5 \leq \alpha 4 \leq 10.0$, and $0 \leq \beta 4 \leq 25.0$.

In the sixth mode, a recording layer includes a phase-change material represented by the following Composition Formula (1-2), and the second protective layer includes a material represented by the following Composition Formula (3), $$Ga_{\alpha 2}Sb_{\beta 2}Sn_{\gamma 2}Ge_{\delta 2}X2_{\in 2}$$  Composition Formula (1-2)

where X2 is at least one selected from Te, Zn, Mn, and In; α2, β2, γ2, δ2, and ∈2 respectively represent an atomic ratio, where $0.04 \leq \alpha 2 \leq 0.09$, $0.56 \leq \beta 2 \leq 0.79$, $0.05 \leq \gamma 2 \leq 0.30$, $0.03 \leq \delta 2 \leq 0.19$, and $0 \leq \in 2 \leq 0.09$, $$ZnO—Al_2O_3—Z[(100-\alpha 5-\beta 5):\alpha 5:\beta 5]$$  Composition Formula (3)

where Z represents any one of an Mn oxide, a Ge oxide, a Ti oxide, and a mixture thereof; α5 and β5 respectively represent a percent by mass, where $0.5 \leq \alpha 5 \leq 10.0$, and $0 \leq \beta 5 \leq 30.0$.

In the seventh mode, a recording layer includes a phase-change material represented by the following Composition Formula (1-3), and a second protective layer includes at least one selected from zinc oxides, indium oxides; tin oxides, and mixtures thereof, $$Mn_{\alpha 3}Sb_{\beta 3}Sn_{\gamma 3}Ge_{\delta 3}X3_{\in 3}$$  Composition Formula (1-3)

where X3 is at least one selected from Te, In, Zn, and Bi; α3, β3, γ3, δ3, and ∈3 respectively represent an atomic ratio, where $0.04 \leq \alpha 3 \leq 0.09$, $0.56 \leq \beta 3 \leq 0.79$, $0.05 \leq \gamma 3 \leq 0.29$, $0.03 \leq \delta 3 \leq 0.23$, and $0 \leq \in 3 \leq 0.09$.

In the eighth mode, a recording layer includes a phase-change material represented by the following Composition Formula (1-3), and a second protective layer includes a material represented by the following Composition Formula (2), $$Mn_{\alpha 3}Sb_{\beta 3}Sn_{\gamma 3}Ge_{\delta 3}X3_{\in 3}$$  Composition Formula (1-3)

where X3 is at least one selected from Te, In, Zn, and Bi; α3, β3, γ3, δ3, and ∈3 respectively represent an atomic ratio, where $0.04 \leq \alpha 3 \leq 0.09$, $0.56 \leq \beta 3 \leq 0.79$, $0.05 \leq \gamma 3 \leq 0.29$, $0.03 \leq \delta 3 \leq 0.23$, and $0 \leq \in 3 \leq 0.09$, $$ZnO—Al—Y[(100-\alpha 4-\beta 4):\alpha 4:\beta 4]$$  Composition Formula (2)

where Y is at least one selected from Mn, Ge, and Ti; α4 and β4 respectively represent a percent by mass, where $0.5 \leq \alpha 4 \leq 10.0$, and $0 \leq \beta 4 \leq 25.0$.

In the ninth mode, a recording layer includes a phase-change material represented by the following Composition Formula (1-3), and
a second protective layer includes a material represented by the following Composition Formula (3), $$Mn_{\alpha 3}Sb_{\beta 3}Sn_{\gamma 3}Ge_{\delta 3}X3_{\in 3}$$  Composition Formula (1-3)

where X3 is at least one selected from Te, In, Zn, and Bi; α3, β3, γ3, δ3, and ∈3 respectively represent an atomic ratio, where $0.04 \leq \alpha 3 \leq 0.09$, $0.56 \leq \beta 3 \leq 0.79$, $0.05 \leq \gamma 3 \leq 0.29$, $0.03 \leq \delta 3 \leq 0.23$, and $0 \leq \in 3 \leq 0.09$, $$ZnO—Al_2O_3—Z[(100-\alpha 5-\beta 5):\alpha 5:\beta 5]$$  Composition Formula (3)

where Z represents any one of an Mn oxide, a Ge oxide, a Ti oxide, and a mixture thereof; α5 and β5 respectively represent a percent by mass, where $0.5 \leq \alpha 5 \leq 10.0$, and $0 \leq \beta 5 \leq 30.0$.

<Optical Recording Medium from First to Third Mode>

In the optical recording medium from first to third mode, in order to ensure a wide recording linear velocity range that enables 8×-speed or more high linear velocity recording of standard linear velocity of DVDs and has exceptional downward compatibility for 3.3×-speed level of standard linear velocity of DVDs, crystallization rate makes as slow as possible by limiting the main component of the recording layer as a phase-change material represented by the following Composition Formula (1-1). The main component in the recording layer means that the contents are 98% by mass or more per the entire a phase-change material.

$$In_{\alpha 1}Sb_{\beta 1}X1_{\gamma 1}$$  Composition Formula (1-1)

where X1 is at least one selected from Ge, Te, Zn, and Mn; α1, β1, and γ1 respectively represent an atomic ratio, where $0.10 \leq \alpha 1 \leq 0.25$, $0.65 \leq \beta 1 \leq 0.80$, and $0.04 \leq \gamma 1 \leq 0.15$.

This becomes unable erasing under high linear velocity recording; however erasing becomes possible by using zinc oxides, indium oxides, tin oxides, or mixtures thereof as the main component of the second protective layer. The reason is thought as that these materials have crystallization acceleration effect for GaSb phase-change materials and by this effect erasing at high linear velocity recording makes possible. The main component is preferably 65% by mass or more per the entire materials of the second protective layer, more preferably 90% by mass or more.

On the other hand, because zinc oxides, indium oxides, and tin oxides have crystallization acceleration effect, low speed recording is not preferable for amorphisation (mark formation); however, amorphous marks can be sufficiently recorded through the adjustment of recording strategy for low speed recording because these are materials for a transparent conductive layer having quite large thermal conductivity compared to that of normal dielectrics and large quenching effect. In order to obtain such quenching effect sufficiently, using the zinc oxides, indium oxides, and tin oxides as materials of a second protective layer become necessary.

In the Composition Formula (1-1): $In_{\alpha 1}Sb_{\beta 1}X_{\delta 1}$, it is necessary to be $0.10 \leq \alpha 1 \leq 0.25$, $0.65 \leq \beta 1 \leq 0.80$, and $0.04 \leq \gamma 1 \leq 0.15$, $0.12 \leq \alpha 1 \leq 0.20$, $0.67 \leq \beta 1 \leq 0.78$, and $0.05 \leq \gamma 1 \leq 0.14$ is preferable. If the added amount (α1) is less than 0.10 formation of amorphous marks becomes difficult because crystallization rate is too fast, whereas if the added amount is more than 0.25, storage reliability and recording properties may be adversely affected because InSb compounds are prone to be separated out. If the added amount (β1) of Sb is less than 0.65, sufficient recording properties may not be obtained because crystallization rate is slow, whereas if the added amount is more than 0.80, recording properties and storage reliability may be caught an issue because crystallization rate becomes too fast.

The X added in InSb phase-change materials include at least one selected from Ge, Te, Zn, and Mn. When Ge and Te are added, storage reliability is improved, and when Zn and Mn are added, both recording sensitivity and modulation rate are improved. Besides, since any of these makes crystallization rate slow, it is necessary that the added amount (γ1) is in a range of $0.04 \leq \gamma 1 \leq 0.15$.

The second protective layer contains a material represented by the following Composition Formula (2) as the main component. Here, the main component is preferable to contain 65% by mass or more per the entire materials of the second protective layer, more preferably 90% by mass or more.

$$ZnO—Al—Y[(100-\alpha 4-\beta 4):\alpha 4:\beta 4]$$  Composition Formula (2)

where Y is at least one selected from Mn, Ge, and Ti; α4 and β4 respectively represent a percent by mass, where $0.5 \leq \alpha 4 \leq 10.0$, and $0 \leq \beta 4 \leq 25.0$.

Al is an essential element for decreasing electric resistivity, and the added amount (α4) is preferably 0.5% by mass to 10.0% by mass, more preferably 1.0% by mass to 9.0% by mass, most preferably 2.0% by mass to 5.0% by mass. If the added amount (α4) is 0.5% by mass or less, resistance can not be sufficiently small, whereas if the added amount (α4) is more than 10% by mass, resistance may become large vice versa.

Y is at least one element of Mn, Ge, and Ti, and by adding the element Y, storage reliability is further improved. Among these, ZnO—Al—Mn using Mn as Y can obtain notable effect on storage reliability. The reason for the improvement of storage reliability is unknown but may be thought as follows.

Because crystallization acceleration effect not only enables erasing at high-speed recording but also promotes crystallization for recorded amorphous marks, it is thought that preserving property, so called archival property of recorded data is degraded. As a method for improving these properties, it is thought that crystallization acceleration effect can be subtly adjusted by adding Mn, Ge, and Ti, and both erasing at high-speed recording and improvement of archival property can be achieved.

The added amount ($\beta4$) of the Y is preferably 25.0% by mass or less, more preferably 10% by mass to 20% by mass. If the added amount ($\beta4$) is more than 25% by mass, crystallization acceleration effect is impaired so that erasing at high-speed recording becomes unable.

The second protective layer contains a material represented by the following Composition Formula (3) as the main component. The main component is preferably to contain 65% by mass or more per the entire materials of the second protective layer, more preferably 90% by mass or more.

$$\text{ZnO—Al}_2\text{O}_3\text{—Z}[(100-\alpha5-\beta5):\alpha5:\beta5] \quad \text{Composition Formula (3)}$$

where Z represents any one of an Mn oxide, a Ge oxide, a Ti oxide, and a mixture thereof; $\alpha5$ and $\beta5$ respectively represent a percent by mass, where $0.5 \leq \alpha5 \leq 10.0$, and $0 \leq \beta5 \leq 30.0$.

For ZnO, adding $Al_2O_3$, Mn oxides, Ge oxides, Ti oxides as a mode can obtain similar effect to adding them as an element.

As with the added amount ($\alpha4$), the added amount ($\alpha5$) of $Al_2O_3$ is preferably 0.5% by mass to 10.0% by mass, more preferably 1.0% by mass to 9.0% by mass, most preferably 2.0% by mass to 5.0% by mass.

The Z represents any one of an Mn oxide, a Ge oxide, a Ti oxide, and a mixture thereof. As for Z, crystallization acceleration effect becomes slightly weak compared to the additive element Y, the added amount ($\beta5$) is preferably 30% by mass or less, more preferably 15% by mass to 25% by mass.

<Optical Recording Medium from Fourth to Sixth Mode>

In the optical recording medium from fourth to sixth mode, in order to ensure a wide recording linear velocity range that enables 8×-speed or more high linear velocity recording of standard linear velocity of DVDs and has exceptional downward compatibility for 3.3×-speed level of standard linear velocity of DVDs, crystallization rate makes as slow as possible by limiting the main component of the recording layer as a phase-change material represented by the following Composition Formula (1-2). Here, the main component means to contain 98 atomic % or more per the entire atoms.

$$\text{Ga}_{\alpha2}\text{Sb}_{\beta2}\text{Sn}_{\gamma2}\text{Ge}_{\delta2}\text{X2}_{\in2} \quad \text{Composition Formula (1-2)}$$

where X2 is at least one selected from Te, Zn, Mn, and In; $\alpha2$, $\beta2$, $\gamma2$, $\delta2$, and $\in2$ respectively represent an atomic ratio, where $0.04 \leq \alpha2 \leq 0.09$, $0.56 \leq \beta2 \leq 0.79$, $0.05 \leq \gamma2 \leq 0.30$, $0.03 \leq \delta2 \leq 0.19$, and $0 \leq \in2 \leq 0.09$.

This becomes unable erasing under high linear velocity recording; however erasing becomes possible by using zinc oxides, indium oxides, tin oxides, or mixtures thereof as the main component of the second protective layer. The reason is thought as that these materials have crystallization acceleration effect for GaSb phase-change materials and by this effect erasing at high linear velocity recording makes possible. The main component is preferably 65% by mass or more per the entire materials of the second protective layer, more preferably 90% by mass or more.

On the other hand, because zinc oxide, indium oxide, and tin oxide have crystallization acceleration effect, low speed recording is not preferable for amorphisation (mark formation); however, amorphous marks can be sufficiently recorded through the adjustment of recording strategy for low speed recording because these are materials for a transparent conductive layer having quite large thermal conductivity compared to that of normal dielectrics and large quenching effect. In order to obtain such quenching effect sufficiently, using the zinc oxide, indium oxide, and tin oxide as a material of the second protective layer becomes necessary.

For GaSb phase-change materials $\text{Ga}_{\alpha2}\text{Sb}_{\beta2}\text{Sn}_{\gamma2}\text{Ge}_{\delta2}\text{X2}_{\in2}$ represented by the Composition Formula (1-2), if Sn is added, crystallization rate increases, whereas if Sn is added too much, preserving property may be adversely effected. Therefore, the added amount $\gamma2$ of the Sn is preferably $0.05 \leq \gamma2 \leq 0.30$, more preferably $0.07 \leq \gamma2 \leq 0.20$.

If the added amount ($\alpha2$) of Ga is less than 0.04, intra circuit distribution of reflected signal after initialization gets worse, which adversely affects on recording properties, whereas if the added amount is more than 0.09, crystallization rate becomes slow, high linear velocity recording becomes unable, and jitter of recording property is hard to decrease. Thus, the range should be $0.04 \leq \alpha2 \leq 0.09$.

By adding Ge, storage reliability can be improved. In particular, saving of recorded data, so called archival property can be improved. However, if Ge is added too much, crystallization rate becomes slow and high linear velocity recording becomes unable. Therefore, the added amount ($\delta2$) of Ge is preferably $0.03 \leq \delta2 \leq 0.19$, more preferably $0.05 \leq \delta2 \leq 0.15$.

Furthermore, by adding Te, storage reliability improves and by adding Zn, Mn, and In, recording sensitivity and modulation rate are improved, however, any of these elements have an effect on making crystallization rate slow. Thus, the added amount ($\in2$) is $0 \leq \in2 \leq 0.09$.

As for Sb, if less than 0.56, high-speed recording can not be realized, whereas if the added amount is more than 0.79, formation of amorphous marks becomes difficult so that recording becomes unable. Thus, should be $0.56 \leq \beta2 \leq 0.79$.

The second protective layer contains a material represented by the following Composition Formula (2) as the main component. Here, the main component is preferably to contain 65% by mass or more per the entire materials of the second protective layer, more preferably 90% by mass or more.

$$\text{ZnO—Al—Y}[(100-\alpha4-\beta4):\alpha4:\beta4] \quad \text{Composition Formula (2)}$$

where Y is at least one selected from Mn, Ge, and Ti; $\alpha4$ and $\beta4$ respectively represent a percent by mass, where $0.5 \leq \alpha4 \leq 10.0$, and $0 \leq \beta4 \leq 25.0$.

Al is an essential element for decreasing electric resistivity, and the added amount ($\alpha4$) is preferably 0.5% by mass to 10.0% by mass, more preferably 1.0% by mass to 9.0% by mass, most preferably 2.0% by mass to 5.0% by mass. If the added amount ($\alpha4$) is less than 0.5% by mass, resistance can not be sufficiently small, whereas if the added amount ($\alpha4$) is more than 10% by mass, resistance may become large vice versa.

Y is at least one element of Mn, Ge, and Ti, and by adding the element Y, storage reliability is further improved. Among these, ZnO—Al—Mn using Mn as Y can obtain notable effect on storage reliability. The reason for the improvement of storage reliability is unknown but may be thought as follows.

Because crystallization acceleration effect not only enables erasing at high-speed recording but also promotes crystallization for recorded amorphous marks, it is thought that preserving property, so called archival property of recorded data is degraded. As a method for improving these properties, it is thought that crystallization acceleration effect can be fine-tuned by adding Mn, Ge, and Ti and the compatibility between erasing of high-speed recording and archival property becomes possible.

Additive amount (β4) of the Y is preferably 25.0% by mass or less, more preferably 10% by mass to 20% by mass. If the added amount (β4) is more than 25% by mass, crystallization acceleration effect is impaired so that erasing at high-speed recording becomes unable.

The second protective layer contains a material represented by the following Composition Formula (3) as the main component. Here, the main component is preferably to contain 65% by mass or more per the entire materials of the second protective layer, more preferably 90% by mass or more.

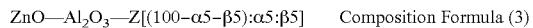
$$ZnO\text{—}Al_2O_3\text{—}Z[(100-\alpha5-\beta5):\alpha5:\beta5] \quad \text{Composition Formula (3)}$$

where Z represents any one of an Mn oxide, a Ge oxide, a Ti oxide, and a mixture thereof; α5 and β5 respectively represent a percent by mass, where $0.5 \leq \alpha5 \leq 10.0$, and $0 \leq \beta5 \leq 30.0$.

For ZnO, adding $Al_2O_3$, Mn oxides, Ge oxides, Ti oxides as a mode can obtain similar effect to adding them as an element.

As with the added amount (α4), the added amount (α5) of $Al_2O_3$ is preferably 0.5% by mass to 10.0% by mass, more preferably 1.0% by mass to 9.0% by mass, most preferably 2.0% by mass to 5.0% by mass.

The Z represents any one of an Mn oxide, a Ge oxide, a Ti oxide, and a mixture thereof. As for the Z, crystallization acceleration effect becomes slightly weak compared to the additive element Y, the added amount (β5) is preferably 30% by mass or less, more preferably 15% by mass to 25% by mass.

<Optical Recording Medium from Seventh to Ninth Mode>

In the optical recording medium from seventh to ninth mode, in order to ensure a wide recording linear velocity range that enables 8×-speed or more high linear velocity recording of standard linear velocity of DVDs and have exceptional downward compatibility for 3.3×-speed level of standard linear velocity of DVDs, crystallization rate makes as slow as possible by limiting the main component of the recording layer as a phase-change material represented by the following Composition Formula (1-3). Here, the main component means to contain 98 atomic % or more per the entire atoms.

$$Mn_{\alpha3}Sb_{\beta3}Sn_{\gamma3}Ge_{\delta3}X3_{\in3} \quad \text{Composition Formula (1-3)}$$

where X3 is at least one selected from Te, In, Zn, and Bi; α3, β3, γ3, δ3, and ∈3 respectively represent an atomic ratio, where $0.04 \leq \alpha3 \leq 0.09$, $0.56 \leq \beta3 \leq 0.79$, $0.05 \leq \gamma3 \leq 0.29$, $0.03 \leq \delta3 \leq 0.23$, and $0 \leq \in3 \leq 0.09$.

This becomes unable erasing under high linear velocity recording; however erasing becomes possible by using zinc oxides, indium oxides, tin oxides, or mixtures thereof as the main component of the second protective layer. The reason is thought as that these materials have crystallization acceleration effect for GaSb phase-change materials and by this effect erasing at high linear velocity recording makes possible. The main component is preferably 65% by mass or more per the entire materials of the second protective layer, more preferably 90% by mass or more.

On the other hand, because a zinc oxide, an indium oxide, and a tin oxide have crystallization acceleration effect, low speed recording is not preferable for amorphisation (mark formation); however, amorphous marks can be sufficiently recorded through the adjustment of recording strategy for low speed recording because these are materials for a transparent conductive layer having quite large thermal conductivity compared to that of normal dielectrics and large quenching effect. In order to obtain such quenching effect sufficiently, using the zinc oxide, indium oxide, and tin oxide as a material of a second protective layer becomes necessary.

For GeSb materials represented by the Composition Formula (1-3), if Sn is added, crystallization rate increases, whereas if Sn is added too much, preserving property becomes degraded. Therefore, $0.05 \leq \gamma3 \leq 0.29$, and $0.07 \leq \gamma3 \leq 0.20$ are preferable. The added amount of Mn is $0.04 \leq \alpha3 \leq 0.09$. If the added amount of Mn is less than 0.04, intra circuit distribution of reflected signal after initialization gets worse, which adversely affects on recording properties, whereas if the added amount is more than 0.09, crystallization rate becomes slow, high-speed recording becomes unable, and jitter of recording properties is hard to down.

By adding Ge, storage reliability can be improved. In particular, preserving property of recording data, called archival property can be significantly improved. Additive amount δ3 of Ge is $0.03 \leq \delta3 \leq 0.23$, more preferably $0.05 \leq \delta3 \leq 0.15$. If the amount of Ge is too large, crystallization rate becomes slow and high-speed recording may become unable.

As for the added amount of Sb, if the added amount is less than 0.56, crystallization rate becomes slow so that sufficient recording properties can not be obtained, whereas if the added amount is more than 0.79, crystallization rate becomes too fast, thereby causing problems with recording properties and storage reliability.

By adding Te, storage reliability is improved. By adding In and Zn, recording sensitivity and modulation rate can be improved but these have an effect on making crystallization rate slow. By adding Bi, crystallization rate gets improved but if the added amount is too much, intra circuit distribution of reflected signal after initialization gets worse, which adversely affects the recording properties. Therefore, these added amounts are in a range of $0 \leq \in3 \leq 0.09$.

The second protective layer contains a material represented by the following Composition Formula (2) as the main component. Herein, the main component is preferably 65% by mass or more per the entire materials of the second protective layer, more preferably 90% by mass or more.

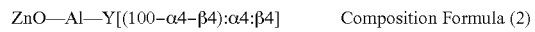
$$ZnO\text{—}Al\text{—}Y[(100-\alpha4-\beta4):\alpha4:\beta4] \quad \text{Composition Formula (2)}$$

where Y is at least one selected from Mn, Ge, and Ti; α4 and β4 respectively represent a percent by mass, where $0.5 \leq \alpha4 \leq 10.0$, and $0 \leq \beta4 \leq 25.0$.

Al is an essential element for decreasing electric resistivity and the added amount (α4) is preferably 0.5% by mass to 10.0% by mass, more preferably 1.0% by mass to 9.0% by mass, most preferably 2.0% by mass to 5.0% by mass. If the added amount (α4) is less than 0.5% by mass or less, resistance can not be sufficiently small, whereas if the added amount (α4) is more than 10% by mass, resistance may become large vice versa.

Y is at least one element of Mn, Ge, and Ti, and by adding the element Y, storage reliability is further improved. Among these, ZnO—Al—Mn using Mn as Y can obtain notable effect on storage reliability. The reason for the improvement of storage reliability is unknown but may be thought as follows.

Because crystallization acceleration effect not only enables erasing at high-speed recording but also promotes crystallization for recorded amorphous marks, it is thought that preserving property, so called archival property of recorded data is degraded. As a method for improving these properties, it is thought that crystallization acceleration effect can be fine-tuned by adding Mn, Ge, and Ti and the compatibility between erasing of high-speed recording and archival property becomes possible.

Additive amount (β4) of the Y is preferably 25.0% by mass or less, more preferably 10% by mass to 20% by mass. If the added amount (β4) is more than 25% by mass, crystallization acceleration effect is impaired so that erasing at high-speed recording becomes unable.

The second protective layer contains a material represented by the following Composition Formula (3) as the main component. Here, the main component is preferably to contain 65% by mass or more per the entire materials of the second protective layer, more preferable 90% by mass or more.

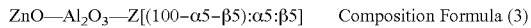

$ZnO\text{—}Al_2O_3\text{—}Z[(100-\alpha5-\beta5):\alpha5:\beta5]$   Composition Formula (3)

where Z represents any one of an Mn oxide, a Ge oxide, a Ti oxide, and a mixture thereof; α5 and β5 respectively represent a percent by mass, where $0.5 \leq \alpha5 \leq 10.0$, and $0 \leq \beta5 \leq 30.0$.

For ZnO, adding $Al_2O_3$, Mn oxides, Ge oxides, Ti oxides as a mode can obtain similar effect to adding them as an element.

As with the added amount (α4), the added amount (α5) of $Al_2O_3$ is preferably 0.5% by mass to 10.0% by mass, more preferably 1.0% by mass to 9.0% by mass, most preferably 2.0% by mass to 5.0% by mass.

The Z represents any one of an Mn oxide, a Ge oxide, a Ti oxide, and a mixture thereof. As for the Z, crystallization acceleration effect becomes slightly weak compared to the additive element Y, the added amount (β5) is preferably 30% by mass or less, more preferably 15% by mass to 25% by mass.

The recording layer can be formed by various gas-phase growth methods such as vacuum evaporation method, sputtering method, plasma CVD method, optical CVD method, ion plating method, and electron beam evaporation method. Among these, the sputtering method is preferable in terms of mass productivity and quality of the film.

The thickness of the recording layer is preferably 5 nm to 20 nm, more preferably 10 nm to 15 nm. If the thickness deviates from the range, it is hard to obtain sufficient recording properties.

The second protective layer can be formed by various gas-phase growth methods such as vacuum evaporation method, sputtering method, plasma CVD method, optical CVD method, ion plating method, and electron beam evaporation method. Among these, the sputtering method is preferable in terms of mass productivity, and quality of the film.

The thickness of the second protective layer is preferably 5 nm to 50 nm, more preferably 10 nm to 40 nm, most preferably 10 nm to 20 nm. If the thickness is less than 5 nm, quenching effect becomes too large and recording sensitivity and jitter property become poor, whereas if the added amount is more than 50 nm, heat accumulation effect becomes too large, formation of an amorphous mark becomes difficult, thereby jitter property and overwriting property become poor.

In the present invention, in order to ensure quenching effect, electric resistivity of a second protective layer is preferably $1.0 \times 10^{-4}$ Ω·cm to $1.0 \times 10^{1}$ Ω·cm, more preferably $1.0 \times 10^{-4}$ Ω·cm to $9.8 \times 10^{0}$ Ω·cm.

Although it is difficult to evaluate thermal conductivity of dielectric materials of the second protective layer correctly, electric resistivity can be used as a substitute in case of dielectric materials for the transparent conductive layer, and it is thought that the smaller electric resistivity be, the higher thermal conductivity it becomes. The lower limit of electric resistivity of dielectric materials for a transparent conductive layer is about $1.0 \times 10^{-4}$ Ω·cm. If the electric resistance is more than $1.0 \times 10^{1}$ Ω·cm, it is not preferable because sufficient quenching effect can not be obtained.

The most efficient recording linear velocity range for the optical recording medium of the present invention is that the maximum recording linear velocity is 30 m/s to 56 m/s and the minimum recording linear velocity is 10 m/s to 14 m/s. If recording linear velocity is within this range, favorable recording properties with stable no generation of abnormal marks and high-speed recording that is 8×-speed or more than standard linear velocity of DVDs can be compatible.

Besides, most of abnormal marks are 3T mark, the shortest mark of DVDs, thereby it is thought to heavily depend on a length of marks. Considered the fact that the length of 3T mark is 0.4 μm and the next longest 4T mark is 0.53 μm, it is presumed that a mark length that such abnormal marks occurs frequently is about 0.5 μm or less. In fact, in CD-RW media that the shortest recording mark length is 0.84 μm, there is no such practical issue.

Hence, in order to achieve a profound effect with an optical recording medium of the present invention, recording that the shortest recording mark length is 0.5 μm or less needs to be performed.

Figure 6:
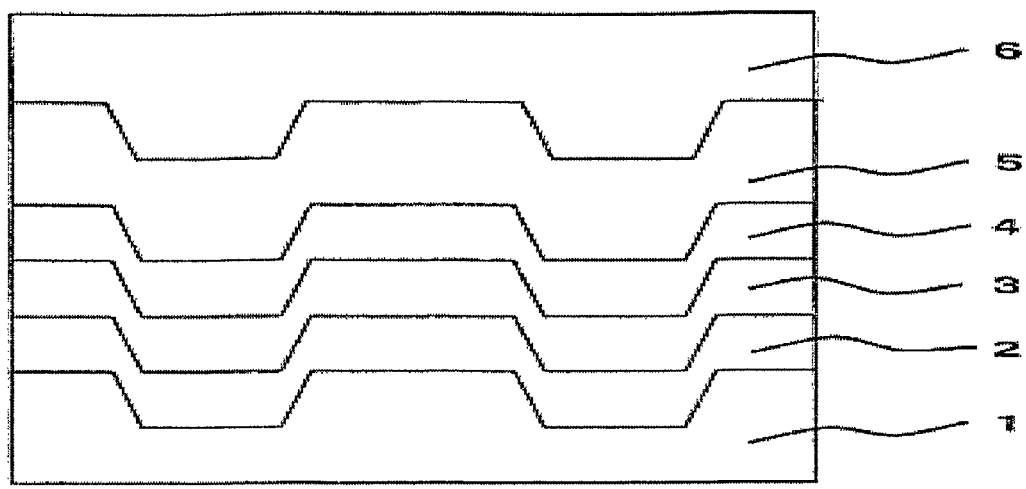
FIG. 6 is a schematic view showing an example of an optical recording medium of the present invention, and an example of DVD+RW, DVD-RW, HD-DVD-RW.
Figure 6:
Figure 7:
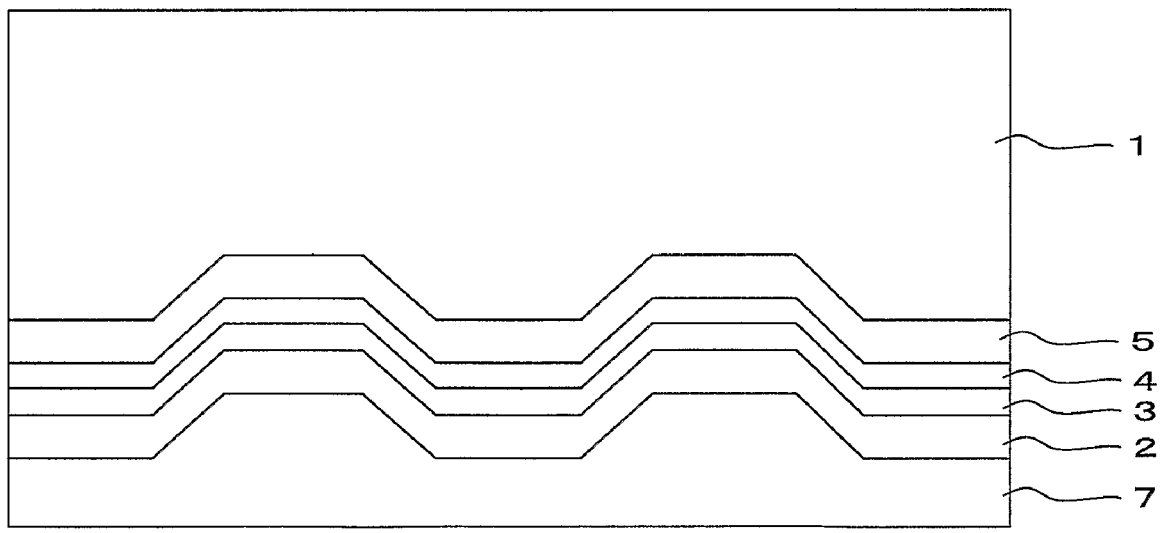
FIG. 7 is a schematic view showing an example of an optical recording medium of the present invention, and showing an example of a Blu-ray Disc.
Figure 7:
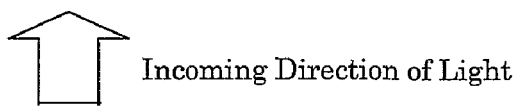

Here, an example of the composition of the optical recording medium of the present invention is shown in FIG. 6 and FIG. 7. FIG. 6 is an example of a DVD+RW, a DVD-RW, and a HD-DVD-RW. FIG. 7 is an example of a Blu-ray Disc.

FIG. 6 is a laminated form having at least a first protective layer 2, a recording layer 3, a second protective layer 4, and a reflective layer 5 formed in this order as viewed from the side of laser beam irradiation on the transparent substrate 1 having a guide groove. In case of DVDs and HD-DVDs, an organic protective layer 6 is formed by spin-coating onto a reflective layer 5 and though not shown in FIG. 6, a place of the same size and normally the same material as a substrate is attached.

FIG. 7 is a laminated form having a transparent cover layer 7, a first protective layer 2, a recording layer 3, a second protective layer 4, and a reflective layer 5 formed in this order as viewed from the side of laser beam irradiation on a transparent substrate 1 having a guide groove.

Optical recording media shown in FIG. 6 and FIG. 7 are examples that a recording layer is a single-layer type, however, an optical recording medium having two recording layers through a transparent intermediate layer can also be used. In this case, a front side layer from the incoming direction of the light needs to be translucent for recording reproducing of a backside layer.

—Substrate—

Example materials of a substrate are glasses, ceramics, and resins. Among these, resins are preferable in view of formability, and cost.

Examples of the resins include a polycarbonate resin, an acrylic resin, an epoxy resin, a polystyrene resin, an acrylonitrile-styrene copolymer resin, a polyethylene resin, a polypropylene resin, a silicone series resin, a fluorine series resin, an ABS resin, and a urethane resin. Among these, a polycarbonate resin and an acrylic resin are particularly preferable in view of formability, optical property, and cost.

The substrate is formed such that the size, thickness and groove shape meet the standards.

A recording and reproducing is performed by controlling a laser beam to be irradiated at the center of the groove by means of the servo mechanism of a pick-up. For this control, the light diffracted by the guide groove in the vertical direction with respect to the scanning direction of the beam is monitored, and the laser beam is positioned at the center of the groove so that the lateral signal levels in the scanning direction are cancelled. The signal intensity of the diffracted light used for this control is determined by the relation between a laser beam diameter, a groove width and a groove depth, and it is generally transformed into a signal intensity generally called as a push-pull signal. The signal intensity increases as the groove width increases, but there is a limitation since the track pitch between recording marks is fixed.

For example, a DVD recording system having a track pitch of 0.74 μm preferably has the signal intensity of 0.2 to 0.6 at a non-recorded state. Similar values are defined for DVD+RW, DVD+R, DVD-RW and DVD-R in their respective written standards. JP-A No. 2002-237096 discloses that the groove width corresponding to this value is preferably 0.17 μm to 0.30 μm at the bottom of the groove. For a high-speed optical recording medium, it is preferably 0.20 μm to 0.30 μm.

In a recording and reproducing system which employs a blue LD, the groove width is similarly defined based on the linear relation with the beam diameter. In any case, the groove width is configured at about a half or slightly less than a half of the track pitch.

This guide groove is usually a wobble so that the recording apparatus can sample the frequency in recording. It allows an input such as address and information necessary for recording by inverting the phase of the wobble and changing the frequency within a determined range.

—First Protective Layer—

A material for the first protective layer is not particularly restricted, and it can be appropriately selected according to applications from heretofore known materials. Examples thereof include a oxide of Si, Zn, In, Mg, Al, Ti and Zr; a nitride of Si, Ge, Al, Ti, B and Zr; a sulfide of Zn and Ta; a carbide of Si, Ta, B, W, Ti and Zr; diamond-like carbon; and a mixture thereof. Among these, a mixture of ZnS and $SiO_2$ with a molar ratio close to 7:3 to 8:2 is preferable. Especially for the first protective layer which is located between the recording layer and the substrate and subject to heat damages caused by thermal expansion, high temperature and changes in a room temperature, $(ZnS)_{80}(SiO_2)_{20}$ on a molar basis is preferable since the optical constants, thermal expansion coefficients and modulus of elasticity are optimized for this composition. It is also possible to use different materials in a laminated form.

A first protective layer has an effect on adjusting reflectance of an optical recording medium and the thickness of the first protective layer is preferably 50 nm to 80 nm. If the thickness is less than 50 nm, reflectance fluctuation for the thickness becomes large, whereas if the thickness is more than 80 nm, deposition time extends and productivity of an optical recording medium may drop. In a thin substrate used for DVDs, deformation of the substrate becomes an issue.

Particularly preferable thickness is the one that reflectance becomes the lowest. It is known that a thickness of a first protective layer is heavily affect on reflectance and reflectance shows changes like sine-wave for the change of a thickness. Here, if the thickness that reflectance becomes the lowest is selected, it leads to the improvement of recording sensitivity and favorable mark formation because the incoming light to a recording layer is the most efficient. However, if reflectance is too low, reading of data signal becomes difficult. Therefore, there is the lower limit of the absolute value of the lowest reflectance.

—Reflective Layer—

As a material for the reflective layer, metals such as Al, Au, Ag, Cu and an alloy thereof as a main component are preferable. Examples of an additional element in alloying include Bi, In, Cr, Ti, Si, Cu, Ag, Pd and Ta.

The thickness of the reflective layer is preferably 100 nm to 300 nm, more preferably 120 nm to 200 nm. If the thickness is less than 100 nm, heat radiation effect may not be obtained. On the other hand, even if the thickness is more than 300 nm, heat radiation effect stays the same, thereby simply forming thickness that does not need.

—Covering Layer—

A cover layer in a Blu-ray Disc is a layer which allows an incidence and transmission of a light and formed with a transparent resin layer having a thickness of 100 μm.

The layers described above are sequentially formed on the substrate by sputtering. Then, an organic protective film is formed and bonded, or a cover layer is formed. After an initialization process, an optical recording layer is produced.

The initialization is a process where a laser beam of 1×(several tens to several hundreds)μm having an intensity of 1 W to 2 W is scanned and irradiated to crystallize the recording layer which was in an amorphous state right after film deposition.

The present invention can provide an optical recording medium that enables control the generation of abnormal marks, a 8×-speed or more high linear velocity recording of standard linear velocity DVDs, excellent downward compatibility for 3.3×-speed as fast as standard linear velocity of DVDs, and obtaining excellent results of both jitter property and reproducing error property in a wide range of linear velocities.

EXAMPLES

The present invention will be illustrated in more detail with reference to Examples and Comparative Examples given below, however, the present invention is not limited to the disclosed Examples. A schematic structure of phase-change optical disks produced in Examples and Comparative Examples is shown in FIG. 6.

Examples A-1 to A-21 and Comparative Examples A-1 to A-12

A first protective layer 2 composed of ZnS—$SiO_2$ (80 mol %:20 mol %) having a thickness of 60 nm, a recording layer 3 composed of a phase-change material shown in Table A1 and Table A2 (values in Table A1 and Table A2 are atomic ratio) having a thickness of 14 nm, a second protective layer 4 composed of ZnO—Al—Mn (78% by mass:2% by mass:20% by mass) having a thickness of 11 nm, and a reflective layer 5 composed of Ag having a thickness of 200 nm were formed in this order on a polycarbonate substrate having a diameter of 120 mm and a thickness of 0.6 mm with a guide groove formed thereon with a track pitch of 0.74 μm, a groove width (concave portion) of 0.3 μm, and a groove depth of 30 nm. RF magnetron sputtering method was used for forming the first protective layer and DC magnetron sputtering method was used for forming the recording layer, the second protective layer, and the reflective layer.

Then, over a surface of the reflective layer, a UV curable resin (manufactured by DAINIPPON INK AND CHEMICALS, INCORPORATED, SD-318) was applied by a spin-coating method such that the film had a thickness of 4 nm to 5 nm to form an environment-resistance protective layer 6, lastly, a similar substrate (not shown) to the polycarbonate substrate was laminated as a protective substrate, thereby a phase-change optical disk having a thickness of 1.2 mm was prepared.

Then, the phase-change optical disk was initialized using an initialization apparatus (manufactured by Hitachi Capital Corporation, POP 120-7 AH) having a laser head equipped with a focusing function for a laser beam having an output wavelength of 830 nm, a width of 1 μm, a length of 75 μm, and a maximum output of 2 W.

The phase-change optical disk was evaluated as to recording property using a DVD evaluation apparatus (manufacture by Pulstec Industrial Co., Ltd., DDU-1000) having an optical pick-up with a wavelength of 660 nm and a numerical aperture NA of 0.65. The evaluation results were given in Table A1 and Table A2.

<Evaluation of Recording Property>

A 2T write strategy was used for recording strategy and for the pulse width, the writing power, and the erasing power, optimum conditions were used. A random pattern was recorded according to EFM+ modulation mode on the same five tracks 10 times at respective recording linear velocities of DVD 3.3×-speed (11.5 m/s), DVD 6×-speed (21 m/s), DVD 8×-speed (28 m/s), DVD 12×-speed (42 m/s), and DVD 16×-speed (56 m/s), and the middle track was evaluated.

[Evaluation Criteria]

A: Jitter (σ/Tw) was 10% or less

B: Jitter (σ/Tw) was more than 10%

As a reproducing apparatus, an optical disk evaluation apparatus (manufactured by Pulstec Industrial Co., Ltd., DDU-1000) having a pick-up with a wavelength of 650 nm and a lens NA of 0.6 was used, the phase-change optical disk was evaluated using reproducing light power of 0.7 mW. The evaluation results were given in Table A1 and Table A2.

PI error i.e. reproducing error was measured by repeatedly recording (DOW 10) on 400 tracks 10 times at each recording linear velocity, and the recorded parts were reproduced at 1×-speed.

[Evaluation Criteria]

A: the number of reproducing errors (PI errors) was 100 or less

B: the number of reproducing errors (PI errors) was 200 or less

C: the number of reproducing errors (PI errors) was 300 or less

D: the number of reproducing errors (PI errors) was more than 300

TABLE A1

|  | In | Sb | Ge | Te | Zn | Mn | Jitter 3.3×-speed | Jitter 6×-speed | Jitter 8×-speed | Jitter 12×-speed | Jitter 16×-speed | PI Error 3.3×-speed | PI Error 6×-speed | PI Error 8×-speed | PI Error 12×-speed | PI Error 16×-speed |
|---|---|---|---|---|---|---|---|---|---|---|---|---|---|---|---|---|
| Comparative Example A-1 | 0.18 | 0.79 | 0.03 |  |  |  | B | B | A | A | A | C | D | A | A | A |
| Example A-1 | 0.17 | 0.79 | 0.04 |  |  |  | A | A | A | A | A | A | A | A | A | A |
| Example A-2 | 0.17 | 0.76 | 0.07 |  |  |  | A | A | A | A | A | A | A | A | A | A |
| Example A-3 | 0.16 | 0.71 | 0.13 |  |  |  | A | A | A | A | A | A | A | A | A | A |
| Example A-4 | 0.15 | 0.70 | 0.15 |  |  |  | A | A | A | A | A | A | A | A | A | A |
| Comparative Example A-2 | 0.14 | 0.70 | 0.16 |  |  |  | A | A | B | B | B | A | A | C | D | D |
| Comparative Example A-3 | 0.18 | 0.79 |  | 0.03 |  |  | B | B | A | A | A | C | D | A | A | A |
| Example A-5 | 0.17 | 0.79 |  | 0.04 |  |  | A | A | A | A | A | A | A | A | A | A |
| Example A-6 | 0.15 | 0.70 |  | 0.15 |  |  | A | A | A | A | A | A | A | A | A | A |
| Comparative Example A-4 | 0.14 | 0.70 |  | 0.16 |  |  | A | A | B | B | B | A | A | B | D | D |
| Comparative Example A-5 | 0.18 | 0.79 |  |  | 0.03 |  | B | B | A | A | A | C | D | B | A | A |
| Example A-7 | 0.17 | 0.79 |  |  | 0.04 |  | A | A | A | A | A | A | B | A | A | A |
| Example A-8 | 0.15 | 0.70 |  |  | 0.15 |  | A | A | A | A | A | A | A | A | A | A |
| Comparative Example A-6 | 0.14 | 0.70 |  |  | 0.16 |  | A | A | B | B | B | A | A | B | D | D |
| Comparative Example A-7 | 0.18 | 0.79 |  |  |  | 0.03 | B | B | A | A | A | C | D | A | A | A |
| Example A-9 | 0.17 | 0.79 |  |  |  | 0.04 | A | A | A | A | A | A | B | A | A | A |
| Example A-10 | 0.15 | 0.70 |  |  |  | 0.15 | A | A | A | A | A | A | A | A | A | A |
| Comparative Example A-8 | 0.14 | 0.70 |  |  |  | 0.16 | A | A | B | B | B | A | A | C | D | D |

TABLE A2

|  | In | Sb | Ge | Te | Zn | Mn | Jitter 3.3×-speed | Jitter 6×-speed | Jitter 8×-speed | Jitter 12×-speed | Jitter 16×-speed | PI Error 3.3×-speed | PI Error 6×-speed | PI Error 8×-speed | PI Error 12×-speed | PI Error 16×-speed |
|---|---|---|---|---|---|---|---|---|---|---|---|---|---|---|---|---|
| Comparative Example A-9 | 0.26 | 0.65 | 0.09 |  |  |  | A | A | A | B | B | A | A | A | D | D |
| Example A-11 | 0.25 | 0.65 | 0.10 |  |  |  | A | A | A | A | A | A | A | A | A | A |
| Example A-12 | 0.10 | 0.77 | 0.13 |  |  |  | A | A | A | A | A | A | B | A | A | A |
| Comparative Example A-10 | 0.09 | 0.78 | 0.13 |  |  |  | B | B | A | A | A | D | D | B | A | A |
| Comparative Example A-11 | 0.25 | 0.64 | 0.11 |  |  |  | A | A | A | B | B | A | A | B | D | D |
| Example A-13 | 0.24 | 0.65 | 0.11 |  |  |  | A | A | A | A | A | A | A | A | B | B |
| Example A-14 | 0.10 | 0.80 | 0.10 |  |  |  | A | A | A | A | A | A | B | A | A | A |
| Comparative Example A-12 | 0.10 | 0.81 | 0.09 |  |  |  | B | A | A | A | A | C | C | A | A | A |
| Example A-15 | 0.18 | 0.77 | 0.03 |  | 0.02 |  | A | A | A | A | A | A | A | A | A | A |
| Example A-16 | 0.18 | 0.77 | 0.03 | 0.02 |  |  | A | A | A | A | A | A | A | A | A | A |
| Example A-17 | 0.18 | 0.77 | 0.03 |  |  | 0.02 | A | A | A | A | A | A | A | A | A | A |
| Example A-18 | 0.17 | 0.77 | 0.02 | 0.02 | 0.02 |  | A | A | A | A | A | A | A | A | A | A |
| Example A-19 | 0.17 | 0.77 | 0.02 | 0.02 |  | 0.02 | A | A | A | A | A | A | A | A | A | A |
| Example A-20 | 0.17 | 0.77 |  | 0.02 | 0.02 | 0.02 | A | A | A | A | A | A | A | A | A | A |
| Example A-21 | 0.15 | 0.77 | 0.02 | 0.02 | 0.02 | 0.02 | A | A | A | A | A | A | A | A | A | A |

From the results shown in Table A1 and Table A2, it was found that when the configuration of disks of Examples were employed, high-speed recording was enabled, and both PI error and jitter property could be lowered in a wide linear velocity range.

Comparative Example A-13

A phase-change optical disk was produced similarly to that in Example A-15 except that a phase-change material of Example A-15 shown in Table A2 was used, a second protective layer was formed using $ZnS$—$SiO_2$ (80 mol %:20 mol %), which is often used in related arts, the thickness of the second protective layer was changed to 7 nm, and an interface layer composed of TiC and $TiO_2$ at a mass ratio of 7:3 having a thickness of 4 nm was formed in between the both layers such that the sulfur component in the second protective layer did not affect Ag in the reflective layer.

The disk was evaluated similarly to those shown in Table A1.

As a result, jitters of the disk recording at 3.3×-speed to 8×-speed were evaluated as B, whereas jitters at 12×-speed and 16×-speed were evaluated as D, PI error of the disk at 3.3×-speed and 8×-speed were evaluated as A, whereas PI error at 6×-speed, 12×-speed, and 16×-speed were evaluated as D.

Examples A-22 to A-27

A phase-change optical disk was produced similarly to that in Example A-15 except that a phase-change material of Example A-15 shown in Table A2 was used and, for a second protective layer, materials having the composition (% by mass) shown in Table A3 was used.

The disk was evaluated similarly to those shown in Table A1. The evaluation results were given in Table A3.

From the results of Table A3, it was found that when the configurations of Examples A-22 to A-27 were employed, high-speed recording was enabled, and both PI error and jitter property could be lowered in a wide linear velocity range.

Examples A-28 to A-33

Resistivity of the second protective layer was changed by adding oxygen to the second protective layer in Example A-26 during sputtering and controlling the amount of oxygen. Resistivity was measured by a four-terminal method that is generally used in forming a single-layer film of a second protective layer on a polycarbonate resin substrate.

A phase-change optical disk produced in this way was evaluated by a similar method to those shown in Table A1. The evaluation results were given in Table A4. Example A-26 was also shown for comparison.

TABLE A4

|  | | Jitter | | | | | PI Error | | | | |
|---|---|---|---|---|---|---|---|---|---|---|---|
|  | Resistivity ($\Omega \cdot cm$) | 3.3×-speed | 6×-speed | 8×-speed | 12×-speed | 16×-speed | 3.3×-speed | 6×-speed | 8×-speed | 12×-speed | 16×-speed |
| Example A-26 | $5.5 \times 10^{-4}$ | A | A | A | A | AA | A | B | A | A | A |
| Example A-28 | $1.0 \times 10^{-4}$ | A | A | A | A | A | A | B | A | A | B |
| Example A-29 | $1.2 \times 10^{-3}$ | A | A | A | A | A | A | B | A | A | B |
| Example A-30 | $1.8 \times 10^{-2}$ | A | A | A | A | A | A | B | A | A | B |
| Example A-31 | $2.6 \times 10^{-1}$ | A | A | A | A | A | A | B | A | A | B |
| Example A-32 | $9.8 \times 10^{0}$ | A | A | A | A | A | B | B | A | B | B |
| Example A-33 | $1.0 \times 10^{1}$ | A | A | A | A | A | B | B | B | B | B |

From the results shown in Table A4, it was found that when the configurations of Examples A-28 to A-33 were employed, high-speed recording was enabled, and both PI error and jitter property could be lowered in a wide linear velocity range.

Examples A-34 to A-47 and Comparative Examples A-14 to A-18

A phase-change optical disk was produced similarly to that in Example A-15 except that phase-change materials shown in Example A-15 in Table A2 was used and materials having the composition (% by mass) shown in Table A5 were used for a second protective layer.

The optical disks were evaluated similarly to those shown Table A1. The results were given in Table A5.

TABLE A3

|  | | | | Jitter | | | | | PI Error | | | | |
|---|---|---|---|---|---|---|---|---|---|---|---|---|---|
|  | $In_2O_3$ | ZnO | $SnO_2$ | 3.3×-speed | 6×-speed | 8×-speed | 12×-speed | 16×-speed | 3.3×-speed | 6×-speed | 8×-speed | 12×-speed | 16×-speed |
| Example A-22 | 100 |  |  | A | A | A | A | A | A | B | A | A | A |
| Example A-23 |  | 100 |  | A | A | A | A | A | B | B | A | A | A |
| Example A-24 |  |  | 100 | A | A | A | A | A | A | B | A | B | B |
| Example A-25 | 90 |  | 10 | A | A | A | A | A | A | B | A | A | A |
| Example A-26 | 90 | 10 |  | A | A | A | A | A | A | B | A | A | A |
| Example A-27 |  | 90 | 10 | A | A | A | A | A | B | B | A | A | A |

TABLE A5

| | ZnO | Al | Mn | Ge | Ti | Jitter 3.3x-speed | Jitter 6x-speed | Jitter 8x-speed | Jitter 12x-speed | Jitter 16x-speed | PI Error 3.3x-speed | PI Error 6x-speed | PI Error 8x-speed | PI Error 12x-speed | PI Error 16x-speed |
|---|---|---|---|---|---|---|---|---|---|---|---|---|---|---|---|
| Example A-34 | 99.5 | 0.5 | | | | A | A | A | A | A | B | B | A | A | A |
| Example A-35 | 99.0 | 1.0 | | | | A | A | A | A | A | A | B | A | A | A |
| Example A-36 | 98.0 | 2.0 | | | | A | A | A | A | A | A | A | A | A | A |
| Example A-37 | 95.0 | 5.0 | | | | A | A | A | A | A | A | A | A | A | A |
| Example A-38 | 91.0 | 9.0 | | | | A | A | A | A | A | A | B | A | A | A |
| Example A-39 | 90.0 | 10.0 | | | | A | A | A | A | A | B | B | A | A | A |
| Example A-40 | 93.0 | 2.0 | 5.0 | | | A | A | A | A | A | A | A | A | A | A |
| Example A-41 | 88.0 | 2.0 | 10.0 | | | A | A | A | A | A | A | A | A | A | A |
| Example A-42 | 73.0 | 2.0 | 25.0 | | | A | A | A | A | A | A | A | A | B | B |
| Comparative Example A-14 | 72.0 | 2.0 | 26.0 | | | A | A | A | A | B | A | A | A | B | A |
| Example A-43 | 93.0 | 2.0 | | 5.0 | | A | A | A | A | A | A | A | A | A | A |
| Example A-44 | 73.0 | 2.0 | | 25.0 | | A | A | A | A | A | A | A | A | A | A |
| Comparative Example A-15 | 72.0 | 2.0 | | 26.0 | | A | A | A | A | B | A | A | A | C | D |
| Example A-45 | 93.0 | 2.0 | | | 5.0 | A | A | A | A | A | A | A | A | A | A |
| Example A-46 | 73.0 | 2.0 | | | 25.0 | A | A | A | A | A | A | A | A | A | A |
| Comparative Example A-16 | 72.0 | 2.0 | | | 26.0 | A | A | A | B | B | A | A | A | C | D |
| Example A-47 | 83.0 | 2.0 | 5.0 | 5.0 | 5.0 | A | A | A | A | A | A | A | A | A | A |
| Comparative Example A-17 | 99.6 | 0.4 | | | | A | A | A | A | B | B | B | A | B | D |
| Comparative Example A-18 | 89.0 | 11.0 | | | | A | A | A | A | B | A | D | B | B | D |

From the results shown in the Table A5, it was found that when a material represented by the following Composition Formula (2) for a second protective layer was employed, high-speed recording was enabled, and both PI error and jitter property could be lowered in a wide linear velocity range.

$$\text{ZnO—Al—Y}[(100-\alpha 4-\beta 4):\alpha 4:\beta 4] \quad \text{Composition Formula (2)}$$

where Y is at least one selected from Mn, Ge, and Ti; $\alpha 4$ and $\beta 4$ respectively represent a percent by mass, where $0.5 \leq \alpha 4 \leq 10.0$, and $0 \leq \beta 4 \leq 25.0$.

Examples A-48 to A-62 and Comparative Examples A-19 to A-23

A phase-change optical disk was produced similarly to that in Example A-15 except that a phase-change material of Example A-15 in Table A2 was used, and for a second protective layer, materials having the composition (% by mass) shown in Table A6 were used.

The optical disks were evaluated similarly to those shown in Table A1. The results were given in Table A6.

TABLE A6

| | ZnO | Al$_2$O$_3$ | MnO$_2$ | GeO$_2$ | TiO$_2$ | Jitter 3.3x-speed | Jitter 6x-speed | Jitter 8x-speed | Jitter 12x-speed | Jitter 16x-speed | PI Error 3.3x-speed | PI Error 6x-speed | PI Error 8x-speed | PI Error 12x-speed | PI Error 16x-speed |
|---|---|---|---|---|---|---|---|---|---|---|---|---|---|---|---|
| Example A-48 | 99.5 | 0.5 | | | | A | A | A | A | A | B | B | A | A | A |
| Example A-49 | 99.0 | 1.0 | | | | A | A | A | A | A | A | B | A | A | A |
| Example A-50 | 98.0 | 2.0 | | | | A | A | A | A | A | A | A | A | A | A |
| Example A-51 | 95.0 | 5.0 | | | | A | A | A | A | A | A | A | A | A | A |
| Example A-52 | 91.0 | 9.0 | | | | A | A | A | A | A | A | B | A | A | A |
| Example A-53 | 90.0 | 10.0 | | | | A | A | A | A | A | B | B | A | A | A |
| Example A-54 | 93.0 | 2.0 | 5.0 | | | A | A | A | A | A | A | A | A | A | A |
| Example A-55 | 88.0 | 2.0 | 10.0 | | | A | A | A | A | A | A | A | A | A | A |
| Example A-56 | 73.0 | 2.0 | 25.0 | | | A | A | A | A | A | A | A | A | A | A |
| Example A-57 | 68.0 | 2.0 | 30.0 | | | A | A | A | A | A | A | A | A | B | B |
| Comparative Example A-19 | 67.0 | 2.0 | 31.0 | | | A | A | A | B | B | A | A | A | C | D |
| Example A-58 | 93.0 | 2.0 | | 5.0 | | A | A | A | A | A | A | A | A | A | A |
| Example A-59 | 68.0 | 2.0 | | 30.0 | | A | A | A | A | A | A | A | A | B | B |
| Comparative Example A-20 | 67.0 | 2.0 | | 31.0 | | A | A | A | B | B | A | A | A | C | D |
| Example A-60 | 93.0 | 2.0 | | | 5.0 | A | A | A | A | A | A | A | A | A | A |
| Example A-61 | 68.0 | 2.0 | | | 30.0 | A | A | A | A | A | A | A | A | B | B |
| Comparative Example A-21 | 67.0 | 2.0 | | | 31.0 | A | A | A | B | B | A | A | A | C | D |
| Example A-62 | 68.0 | 2.0 | 10.0 | 10.0 | 10.0 | A | A | A | A | A | A | A | A | A | A |
| Comparative Example A-22 | 99.6 | 0.4 | | | | A | A | A | A | B | B | B | A | B | D |
| Comparative Example A-23 | 89.0 | 11.0 | | | | A | A | A | A | B | A | C | B | B | D |

From the results shown in Table A6, it was found that when a material represented by the following Composition Formula (3) for a second protective layer was employed, high-speed recording was enabled, and both PI error and jitter property could be lowered in a wide linear velocity range.

$$ZnO-Al_2O_3-Z[(100-\alpha5-\beta5):\alpha5:\beta5] \quad \text{Composition Formula (3)}$$

where Z represents any one of an Mn oxide, a Ge oxide, a Ti oxide, and a mixture thereof; $\alpha5$ and $\beta5$ respectively represent a percent by mass, where $0.5 \leq \alpha5 \leq 10.0$, and $0 \leq \beta5 \leq 30.0$.

Examples A-63 to A-72

Here, jitter variation of each optical disk of Examples A-36, A-41, A-44, A-46, A-47, A-50, A-55, A-59, A-61, and A-62 was evaluated when recording by a similar recording method to those shown in Table A1 and storing the respective disks at a temperature of 80° C. and a relative humidity of 85% for 100 hours.

For respective disks of Example A-63 to A-72, evaluation results were given in Table A7. It was found that the present invention can provide optical disks having superior archival property.

TABLE A7

| | Jitter Elevation after storage for 100 hrs under 80° C., 85% RH |
|---|---|
| Example A-63 | 4.1 |
| Example A-64 | 0 |
| Example A-65 | 0 |
| Example A-66 | 0 |
| Example A-67 | 0 |
| Example A-68 | 3.5 |
| Example A-69 | 0 |
| Example A-70 | 0 |
| Example A-71 | 0 |
| Example A-72 | 0 |

Example A-73

A reflective layer of $Ag_{99.5}Bi_{0.5}$ (atomic %) having a thickness of 140 nm, a second protective layer composed of ZnO—Al—Mn (78% by mass:2% by mass:20% by mass) having a thickness of 12 nm, a recording layer composed of the same material shown in Example A-1, and a first protective layer composed of ZnS—SiO₂ (80 mol %:20 mol %) having a thickness of 33 nm were formed in this order on a polycarbonate substrate having a diameter of 120 mm and a thickness of 1.1 mm with a groove formed thereon with a pitch of 0.32 µm, a groove width (at concave portion) of 0.2 µm, and a groove depth of 22 nm in the same film forming method as in Example A-1.

Lastly, an adhesive sheet having a thickness of 75 nm was laminated through a UV curable resin having a thickness of 25 nm to form an optically-transparent layer having a thickness of 0.1 mm; thereby an optical recording medium was produced.

Then, the optical recording medium was initialized in the same manner as in Example A-1.

Each of the prepared optical recording media were evaluated as to recording properties using a Blu-Ray Disc evaluation apparatus (manufactured by Pulstec Industrial Co., Ltd., ODU-1000).

The random pattern was recorded using a pick-up head having a wavelength of 405 nm, a lens NA of 0.85 and using modulation mode (1-7) RLL with the shortest mark length of 0.149 µm.

Recording linear velocities were set at 4.9 m/s, 9.8 m/s, and 19.6 m/s, and the random pattern was recorded after selecting respective optimal recording powers.

Jitters were measured using Limit EQ, a signal processing technology used for evaluation of recording properties of a Blu-Ray Disc, and therefore recording was performed on the same five tracks 10 times and the middle track was evaluated.

For, Random SER i.e. reproducing error was measured by repeatedly recording (DOW 10) on 400 tracks 10 times at each recording linear velocity, and the recorded part was reproduced with a reproducing power of 0.30 mW and a linear velocity of 4.9 m/s. The results are as follows.

| Linear velocity | jitter | Random SER |
|---|---|---|
| 4.9 m/s | 5.5% | $4.5 \times 10^{-5}$ |
| 9.8 m/s | 4.8% | $1.3 \times 10^{-5}$ |
| 19.6 m/s | 4.2% | $2.0 \times 10^{-5}$ |

The values were sufficiently favorable values in practical use as Blu-Ray Discs, and it was verified that the effect of the present invention was obtainable with the configuration of the Example.

Examples B-1 to B-26 and Comparative Examples B-1 to B-12

FIG. 6 shows a schematic cross-sectional view of the optical recording medium produced in the Examples and Comparative Examples.

For substrate 1, a polycarbonate substrate having a diameter of 120 mm and a thickness of 0.6 mm with a guide groove formed thereon with a track pitch of 0.74 µm, a groove width of 0.3 µm, and a groove depth of 30 nm was used.

A first protective layer 2 was ZnS—SiO₂ (80 mol %:20 mol %) having a thickness of 60 nm, a recording layer 3 was composed of a phase-change material with a thickness of 14 nm having a composition shown in Table B1 and Table B2, a second protective layer 4 was composed of ZnO—Al—Mn (78% by mass:2% by mass:20% by mass) having a thickness of 11 nm, and a reflective layer 5 was composed of Ag having a thickness of 200 nm. RF magnetron sputtering method was used for forming the first protective layer 2, and DC magnetron sputtering method was used for forming the recording layer 3, the second protective layer 4, and the reflective layer 5.

Then, after applying a UV curable resin (manufactured by DAINIPPON INK AND CHEMICALS, INCORPORATED, SD318) as an environment-resistance protective layer 6 over the surface of the reflective layer 5 to harden the UV curable resin, a substrate (not shown in FIG) similar to the substrate 1 was laminated, thereby each optical recording medium (optical disks) having a thickness of 1.2 mm was obtained.

Subsequently, the optical disks were initialized by means of an initialization apparatus (manufactured by Hitachi Capital Corporation, POP 120-7 AH) having a laser head equipped with a focusing function for a laser beam having an output wavelength of 830 nm, a width of 1 µm, a length of 75 µm, and a maximum output of 2 W.

The optical recording media were evaluated as to recording properties using a DVD evaluation apparatus (manufactured by Pulstec Industrial Co., Ltd., DDU-1000) having an optical pick-up with a wavelength of 660 nm and a numerical aperture NA of 0.65.

A 2T write strategy was used for recording strategy, and for the pulse width, the writing power, and the erasing power, optimum conditions were used. A random pattern was recorded according to EFM+ modulation mode on the same five tracks 10 times at respective recording linear velocities of DVD 3.3×-speed (11.5 m/s), DVD 6×-speed (21 m/s), DVD 8×-speed (28 m/s), DVD 12×-speed (42 m/s), and DVD 16×-speed (56 m/s) and the middle track was evaluated. The evaluation results were given in Table B1 and Table B2.

[Evaluation Criteria]
A: Jitter (σ/Tw) was 10% or less
B: Jitter (σ/Tw) was more than 10%

PI error i.e. the reproducing error was measured by repeatedly recording (DOW 10) on 400 tracks 10 times at each recording linear velocity, and the recorded part was reproduced at 1×-speed.

As a reproducing apparatus, an optical disk evaluation apparatus (manufactured by Pulstec Industrial Co., Ltd., DDU-1000) having a pick-up with a wavelength of 650 nm and a lens NA of 0.6 was used, and the optical recording medium was evaluated with reproducing light power of −0.7 mW.

[Evaluation Criteria]
A: the number of reproducing errors (PI errors) was 100 or less
B: the number of reproducing errors (PI errors) was 200 or less
C: the number of reproducing errors (PI errors) was 300 or less
D: the number of reproducing errors (PI errors) was more than 300

TABLE B1

| | Ga | Sb | Sn | Ge | Te | In | Zn | Mn | Jitter 3.3×-speed | Jitter 6×-speed | Jitter 8×-speed | Jitter 12×-speed | Jitter 16×-speed | PI Error 3.3×-speed | PI Error 6×-speed | PI Error 8×-speed | PI Error 12×-speed | PI Error 16×-speed |
|---|---|---|---|---|---|---|---|---|---|---|---|---|---|---|---|---|---|---|
| Comparative Example B-1 | 0.03 | 0.70 | 0.17 | 0.10 | — | — | — | — | B | B | A | A | A | C | D | A | B | B |
| Example B-1 | 0.04 | 0.70 | 0.17 | 0.09 | — | — | — | — | A | A | A | A | A | A | A | A | A | A |
| Example B-2 | 0.09 | 0.70 | 0.17 | 0.04 | — | — | — | — | A | A | A | A | A | A | A | A | A | A |
| Comparative Example B-2 | 0.10 | 0.70 | 0.17 | 0.03 | — | — | — | — | A | B | B | A | A | B | C | C | B | B |
| Comparative Example B-3 | 0.06 | 0.55 | 0.29 | 0.10 | — | — | — | — | A | A | B | B | B | A | A | C | D | D |
| Example B-3 | 0.06 | 0.56 | 0.28 | 0.10 | — | — | — | — | A | A | A | A | A | A | A | B | B | B |
| Example B-4 | 0.05 | 0.79 | 0.06 | 0.10 | — | — | — | — | A | A | A | A | A | A | A | A | A | A |
| Comparative Example B-4 | 0.05 | 0.80 | 0.05 | 0.10 | — | — | — | — | A | A | A | B | B | A | A | B | C | C |
| Comparative Example B-5 | 0.04 | 0.56 | 0.31 | 0.09 | — | — | — | — | B | B | A | A | A | C | D | A | A | A |
| Example B-5 | 0.04 | 0.57 | 0.30 | 0.09 | — | — | — | — | A | A | A | A | A | A | A | A | A | A |
| Example B-6 | 0.04 | 0.79 | 0.05 | 0.12 | — | — | — | — | A | A | A | A | A | A | A | A | A | A |
| Comparative Example B-6 | 0.05 | 0.79 | 0.04 | 0.12 | — | — | — | — | A | A | B | B | B | A | B | C | D | D |
| Comparative Example B-7 | 0.08 | 0.70 | 0.20 | 0.02 | — | — | — | — | B | A | A | A | A | D | A | B | C | C |
| Example B-7 | 0.07 | 0.70 | 0.20 | 0.03 | — | — | — | — | A | A | A | A | A | A | A | A | A | A |
| Example B-8 | 0.04 | 0.65 | 0.12 | 0.19 | — | — | — | — | A | A | A | A | A | A | A | A | A | A |
| Comparative Example B-8 | 0.04 | 0.65 | 0.11 | 0.20 | — | — | — | — | A | A | B | B | B | A | A | D | D | D |
| Example B-9 | 0.06 | 0.69 | 0.14 | 0.10 | 0.01 | — | — | — | A | A | A | A | A | A | A | A | A | A |
| Example B-10 | 0.05 | 0.69 | 0.14 | 0.10 | 0.02 | — | — | — | A | A | A | A | A | A | A | A | A | A |
| Example B-11 | 0.04 | 0.69 | 0.14 | 0.04 | 0.09 | — | — | — | A | A | A | A | A | A | A | A | A | A |
| Comparative Example B-9 | 0.04 | 0.69 | 0.14 | 0.03 | 0.10 | — | — | — | A | A | B | B | B | A | A | A | A | A |

TABLE B2

| | Ga | Sb | Sn | Ge | Te | In | Zn | Mn | Jitter 3.3×-speed | Jitter 6×-speed | Jitter 8×-speed | Jitter 12×-speed | Jitter 16×-speed | PI Error 3.3×-speed | PI Error 6×-speed | PI Error 8×-speed | PI Error 12×-speed | PI Error 16×-speed |
|---|---|---|---|---|---|---|---|---|---|---|---|---|---|---|---|---|---|---|
| Example B-12 | 0.06 | 0.69 | 0.14 | 0.10 | — | 0.01 | — | — | A | A | A | A | A | A | A | A | A | A |
| Example B-13 | 0.05 | 0.69 | 0.14 | 0.10 | — | 0.02 | — | — | A | A | A | A | A | A | A | A | A | A |
| Example B-14 | 0.04 | 0.69 | 0.14 | 0.04 | — | 0.09 | — | — | A | A | A | A | A | A | A | A | A | A |
| Comparative Example B-10 | 0.04 | 0.69 | 0.14 | 0.03 | — | 0.10 | — | — | B | A | A | A | A | B | D | B | A | A |
| Example B-15 | 0.06 | 0.69 | 0.14 | 0.10 | — | — | 0.01 | — | A | A | A | A | A | A | A | A | A | A |
| Example B-16 | 0.05 | 0.69 | 0.14 | 0.10 | — | — | 0.02 | — | A | A | A | A | A | A | A | A | A | A |
| Example B-17 | 0.04 | 0.69 | 0.14 | 0.04 | — | — | 0.09 | — | A | A | A | A | A | A | A | A | A | A |
| Comparative Example B-11 | 0.04 | 0.69 | 0.14 | 0.03 | — | — | 0.10 | — | A | A | B | B | B | A | A | C | D | D |
| Example B-18 | 0.06 | 0.69 | 0.14 | 0.10 | — | — | — | 0.01 | A | A | A | A | A | A | A | A | A | A |
| Example B-19 | 0.05 | 0.69 | 0.14 | 0.10 | — | — | — | 0.02 | A | A | A | A | A | A | A | A | A | A |
| Example B-20 | 0.04 | 0.69 | 0.14 | 0.04 | — | — | — | 0.09 | A | A | A | A | A | A | A | A | A | A |
| Comparative Example B-12 | 0.04 | 0.69 | 0.14 | 0.03 | — | — | — | 0.10 | A | A | A | B | B | A | A | A | C | C |
| Example B-21 | 0.05 | 0.69 | 0.14 | 0.10 | 0.01 | 0.01 | — | — | A | A | A | A | A | A | A | A | A | A |
| Example B-22 | 0.05 | 0.69 | 0.14 | 0.10 | 0.01 | — | 0.01 | — | A | A | A | A | A | A | A | A | A | A |
| Example B-23 | 0.05 | 0.69 | 0.14 | 0.10 | 0.01 | — | — | 0.01 | A | A | A | A | A | A | A | A | A | A |
| Example B-24 | 0.05 | 0.69 | 0.14 | 0.10 | — | 0.01 | 0.01 | — | A | A | A | A | A | A | A | A | A | A |
| Example B-25 | 0.05 | 0.69 | 0.14 | 0.10 | — | 0.01 | — | 0.01 | A | A | A | A | A | A | A | A | A | A |
| Example B-26 | 0.05 | 0.69 | 0.14 | 0.10 | — | — | 0.01 | 0.01 | A | A | A | A | A | A | A | A | A | A |

From the results shown in Table B1 and Table B2, it was found that high-speed recording was enabled, and both PI error and jitter property could be lowered in a wide linear velocity range in Example B-1 to B-26.

After storing the optical recording media of Example B-9 and Example B-10 at a temperature of 80° C. and a relative humidity of 85% for 100 hours, the random pattern was recorded in the above-noted similar method. It was found that the optical recording medium of Example B-10 showed excellent results on both jitter and PI error for each linear velocity and excellent storage property.

Then, comparing the optimum writing power of each optical recording medium of Examples B-12, B-13, B-15 to the optimum writing power of each optical recording medium B-16, B-18, and B-19, it was found that the jitter value of the optical recording media Example B-13, B-16, and B-19 had 2 mW to 3 mW lower than the jitter values of the optical recording media of Examples B-12, B-15, and B-18, and showed more excellent recording sensitivity.

Comparative Example B-13

An optical recording medium was produced similarly to that in Example B-1 except that material of a second protective layer was changed to ZnS—SiO$_2$ (80 mol %:20 mol %), which is often used in related arts, the thickness was changed to 7 nm, and an interface layer composed of TiC and TiO$_2$ at a mass ratio of 7:3, having a thickness of 4 nm was formed in between the both layers such that the sulfur component in the second protective layer did not affect Ag in the reflective layer. RF magnetron sputtering method was used for forming a second protective layer 4 and an interface layer.

The optical recording medium was evaluated in the same manner as in Example B-1. The evaluation results demonstrated that the jitters of the disk at 3.3×-speed to 8×-speed were evaluated as B, whereas jitters at 12×-speed and 16×-speed were evaluated as D, PI error of the disk at 3.3×-speed and 8×-speed were evaluated as A, whereas PI error at 6×-speed, 12×-speed, and 16×-speed were evaluated as D.

Examples B-27 to B-32

Optical recording media were produced similarly to that in Example B-1 except that a material shown in Table B3 was used for a second protective layer 4. Values shown in columns for each compound represent compositions (% by mass).

These optical recording media were evaluated in the same manner as in Example B-1. The results were given in Table B3.

TABLE B3

| | In$_2$O$_3$ | ZnO | SnO$_2$ | Jitter | | | | | PI Error | | | | |
|---|---|---|---|---|---|---|---|---|---|---|---|---|---|
| | | | | 3.3×-speed | 6×-speed | 8×-speed | 12×-speed | 16×-speed | 3.3×-speed | 6×-speed | 8×-speed | 12×-speed | 16×-speed |
| Example B-27 | 100 | | | A | A | A | A | A | B | B | B | B | C |
| Example B-28 | | 100 | | A | A | A | A | A | A | A | B | B | C |
| Example B-29 | | | 100 | A | A | A | A | A | B | B | B | B | C |
| Example B-30 | 90 | | 10 | A | A | A | A | A | B | B | B | B | C |
| Example B-31 | 90 | 10 | | A | A | A | A | A | A | A | B | B | C |
| Example B-32 | | 90 | 10 | A | A | A | A | A | B | B | B | B | C |

From the results shown in Table B3, it was found that high-speed recording was enabled, and both PI error and jitter property could be lowered in a wide linear velocity range in the Examples.

Examples B-33 to B-37

Optical recording media were produced similarly to that in Example B-1 except that electric resistivity was changed using the same material as in Example B-31 for a second protective layer 4, by adding oxygen during sputtering and controlling the amount of oxygen.

Electric resistivity was measured by the four-terminal method which is generally used for forming a single-layer film of a second protective layer 4 on a polycarbonate substrate.

These optical recording medium were evaluated in the same manner as in Example B-1, and the evaluation results are given in Table B4 with the results of Example B-31.

TABLE B4

| | Resistivity ($\Omega \cdot cm$) | Jitter | | | | | PI Error | | | | |
|---|---|---|---|---|---|---|---|---|---|---|---|
| | | 3.3×-speed | 6×-speed | 8×-speed | 12×-speed | 16×-speed | 3.3×-speed | 6×-speed | 8×-speed | 12×-speed | 16×-speed |
| Example B-31 | $1.0 \times 10^{-4}$ | A | A | A | A | A | A | A | B | B | C |
| Example B-33 | $1.2 \times 10^{-3}$ | A | A | A | A | A | A | A | B | B | C |
| Example B-34 | $1.8 \times 10^{-2}$ | A | A | A | A | A | A | B | B | B | C |
| Example B-35 | $2.6 \times 10^{-1}$ | A | A | A | A | A | A | B | B | B | C |
| Example B-36 | $9.8 \times 10^{0}$ | A | A | A | A | A | A | B | B | B | C |
| Example B-37 | $1.0 \times 10^{1}$ | A | A | A | A | A | B | B | B | B | C |

From the results shown in Table B4, it was found that the optical recording medium, which electric resistivity of a second protective layer was $1.0 \times 10^{-4}$ $\Omega \cdot cm$ to $1.0 \times 10^{1}$ $\Omega \cdot cm$, could perform high-speed recording and could lower both PI error and jitter property in a wide linear velocity range.

Examples B-38 to B-51 and Comparative Examples B-14 to B-18

Optical recording media were produced similarly to that in Example B-1 except that a material shown in Table B5 was used for a second protective layer 4. Values shown columns for each compound represent compositions (% by mass).

These optical recording media were evaluated similarly to those shown in Example B-1. The results were given in Table B5.

TABLE B5

|  | ZnO | Al | Mn | Ge | Ti | Jitter 3.3x-speed | 6x-speed | 8x-speed | 12x-speed | 16x-speed | PI Error 3.3x-speed | 6x-speed | 8x-speed | 12x-speed | 16x-speed |
|---|---|---|---|---|---|---|---|---|---|---|---|---|---|---|---|
| Example B-38 | 99.5 | 0.5 |  |  |  | A | A | A | A | A | B | B | A | A | A |
| Example B-39 | 99.0 | 1.0 |  |  |  | A | A | A | A | A | A | B | A | A | A |
| Example B-40 | 98.0 | 2.0 |  |  |  | A | A | A | A | A | A | A | A | A | A |
| Example B-41 | 95.0 | 5.0 |  |  |  | A | A | A | A | A | A | A | A | A | A |
| Example B-42 | 91.0 | 9.0 |  |  |  | A | A | A | A | A | A | B | A | A | A |
| Example B-43 | 90.0 | 10.0 |  |  |  | A | A | A | A | A | B | B | A | A | A |
| Example B-44 | 93.0 | 2.0 | 5.0 |  |  | A | A | A | A | A | A | A | A | A | A |
| Example B-45 | 88.0 | 2.0 | 10.0 |  |  | A | A | A | A | A | A | A | A | A | A |
| Example B-46 | 73.0 | 2.0 | 25.0 |  |  | A | A | A | A | A | A | A | A | A | B |
| Comparative Example B-14 | 64.0 | 10.0 | 26.0 |  |  | A | A | A | A | A | A | A | A | B | C |
| Example B-47 | 93.0 | 2.0 |  | 5.0 |  | A | A | A | A | A | A | A | A | A | A |
| Example B-48 | 73.0 | 2.0 |  | 25.0 |  | A | A | A | A | A | A | B | A | A | B |
| Comparative Example B-15 | 64.0 | 10.0 |  | 26.0 |  | A | A | A | A | A | A | B | A | B | C |
| Example B-49 | 93.0 | 2.0 |  |  | 5.0 | A | A | A | A | A | A | A | A | A | A |
| Example B-50 | 73.0 | 2.0 |  |  | 25.0 | A | A | A | A | A | A | B | A | B | B |
| Comparative Example B-16 | 64.0 | 10.0 |  |  | 26.0 | A | A | A | A | A | A | B | A | B | C |
| Example B-51 | 83.0 | 2.0 | 5.0 | 5.0 | 5.0 | A | A | A | A | A | A | A | A | A | A |
| Comparative Example B-17 | 99.6 | 0.4 |  |  |  | A | A | A | A | B | A | C | A | A | D |
| Comparative Example B-18 | 89.0 | 11.0 |  |  |  | A | A | A | A | B | A | D | A | A | D |

From the results shown in Table B5, being, it was found that when the material represented by the following Composition Formula (2) as a material of a second protective layer 4 was employed, high linear velocity recording was enabled, and both PI error and jitter property could be lowered in a wide linear velocity range.

$$\mathrm{ZnO{-}Al{-}Y[(100{-}\alpha 4{-}\beta 4){:}\alpha 4{:}\beta 4]} \quad \text{Composition Formula (2)}$$

where Y is at least one selected from Mn, Ge, and Ti; $\alpha 4$ and $\beta 4$ respectively represent a percent by mass, where $0.5 \leqq \alpha 4 \leqq 10.0$, and $0 \leqq \beta 4 \leqq 25.0$.

Examples B-52 to B-66 and Comparative Examples B-19 to B-23

Optical recording media were produced similarly to that in Example B-1 except that a material shown in Table B6 was used for a second protective layer 4. Values shown columns for each compound represent the compositions (% by mass).

These optical recording media were evaluated in the same manner as in Example B-1. The results were given in Table B6.

TABLE B6

|  | ZnO | $Al_2O_3$ | $MnO_2$ | $GeO_2$ | $TiO_2$ | Jitter 3.3x-speed | 6x-speed | 8x-speed | 12x-speed | 16x-speed | PI Error 3.3x-speed | 6x-speed | 8x-speed | 12x-speed | 16x-speed |
|---|---|---|---|---|---|---|---|---|---|---|---|---|---|---|---|
| Example B-52 | 99.5 | 0.5 |  |  |  | A | A | A | A | A | B | B | A | A | A |
| Example B-53 | 99.0 | 1.0 |  |  |  | A | A | A | A | A | A | A | A | A | A |
| Example B-54 | 98.0 | 2.0 |  |  |  | A | A | A | A | A | A | A | A | A | A |
| Example B-55 | 95.0 | 5.0 |  |  |  | A | A | A | A | A | A | A | A | A | A |
| Example B-56 | 91.0 | 9.0 |  |  |  | A | A | A | A | A | A | B | A | A | A |
| Example B-57 | 90.0 | 10.0 |  |  |  | A | A | A | A | A | B | B | A | A | A |
| Example B-58 | 93.0 | 2.0 | 5.0 |  |  | A | A | A | A | A | A | A | A | A | A |
| Example B-59 | 88.0 | 2.0 | 10.0 |  |  | A | A | A | A | A | A | A | A | A | A |
| Example B-60 | 73.0 | 2.0 | 25.0 |  |  | A | A | A | A | A | A | A | A | A | A |
| Example B-61 | 68.0 | 2.0 | 30.0 |  |  | A | A | A | A | A | A | B | A | A | B |
| Comparative Example B-19 | 64.0 | 5.0 | 31.0 |  |  | A | A | A | A | A | A | B | A | B | C |
| Example B-62 | 93.0 | 2.0 |  | 5.0 |  | A | A | A | A | A | A | A | A | A | A |
| Example B-63 | 68.0 | 2.0 |  | 30.0 |  | A | A | A | A | A | A | B | A | B | B |
| Comparative Example B-20 | 64.0 | 5.0 |  | 31.0 |  | A | A | A | A | A | A | B | A | B | C |
| Example B-64 | 93.0 | 2.0 |  |  | 5.0 | A | A | A | A | A | A | A | A | A | A |
| Example B-65 | 68.0 | 2.0 |  |  | 30.0 | A | A | A | A | A | A | B | A | B | B |
| Comparative Example B-21 | 64.0 | 5.0 |  |  | 31.0 | A | A | A | A | A | A | B | A | B | C |
| Example B-66 | 68.0 | 2.0 | 10.0 | 10.0 | 10.0 | A | A | A | A | A | A | A | A | A | A |
| Comparative Example B-22 | 99.6 | 0.4 |  |  |  | A | A | A | A | B | A | C | A | A | D |
| Comparative Example B-23 | 89.0 | 11.0 |  |  |  | A | A | A | A | B | A | C | A | A | D |

From the results shown in Table B6, it was found that when the material represented by the following Composition Formula (3) as a material of a second protective layer was employed, high linear velocity recording was enabled, and both PI Error and jitter property could be lowered in a wide linear velocity range.

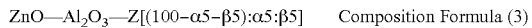  Composition Formula (3)

where Z represents any one of an Mn oxide, a Ge oxide, a Ti oxide, and a mixture thereof; α5 and β5 respectively represent a percent by mass, where $0.5 \leq \alpha 5 \leq 10.0$, and $0 \leq \beta 5 \leq 30.0$.

Examples B-67 to B-76

After the random pattern was recorded on each optical recording medium of Examples B-40, B-45, B-48, Example B-50, B-51, B-54, B-59, B-63, B-65, and B-66 in the same manner as in Example B-1, the optical recording media were stored at a temperature of 80° C. and a relative humidity of 85% for 100 hours. The each of the optical recording media were taken as Examples B-67 to B-76 and evaluated as to change in jitters in the same manner as in Example B-1. The evaluation results were given in Table B7.

TABLE B7

| | Jitter Elevation after storage for 100 hrs under 80° C., 85% RH |
|---|---|
| Example B-67 | 4.1 |
| Example B-68 | 0 |
| Example B-69 | 0 |
| Example B-70 | 0 |
| Example B-71 | 0 |
| Example B-72 | 3.5 |
| Example B-73 | 0 |
| Example B-74 | 0 |
| Example B-75 | 0 |
| Example B-76 | 0 |

From the results shown in Table B7, it was found that when any one of Mn, Ge, Ti or a mixture thereof was added to ZnO—Al, and when any one of $MnO_2$, $GeO_2$, $TiO_2$ or a mixture thereof was added to ZnO—$Al_2O_3$, increases in jitters were smaller and archival property was more excellent than in the case where none of them was added.

Example B-77

A reflective layer of $Ag_{99.5}Bi_{0.5}$ (atomic %) having a thickness of 140 nm, a second protective layer composed of ZnO—Al—Mn (78% by mass: 2% by mass:20% by mass) having a thickness of 11 nm, a recording layer composed of the same materials shown in Example B-1, a first protective layer of ZnS—$SiO_2$ (80 mol %:20 mol %) having a thickness of 33 nm were sequentially formed on a polycarbonate substrate having a diameter of 120 mm, a thickness of 1.1 mm with a guide groove formed thereon with a pitch of 0.32 μm, a groove width (at concave portion) of 0.2 μm, and a groove depth of 22 nm.

Lastly, an adhesive sheet having a thickness of 75 nm was laminated through a UV curable resin having a thickness of 25 nm to form an optically-transparent layer having a thickness of 0.1 mm; thereby an optical recording medium was produced.

Then, the optical recording medium was initialized similarly to that in Example B-1.

Each of the prepared optical recording media was evaluated as to recording properties using a Blu-Ray Disc evaluation apparatus (manufactured by Pulstec Industrial Co., Ltd., ODU-1000).

The random pattern was recorded using a pick-up head with a wavelength of 405 nm, a lens NA of 0.85 and using modulation mode (1-7) RLL with the shortest mark length of 0.149 μm.

Recording linear velocities were set at 4.9 m/s, 9.8 m/s, and 19.6 m/s, the random pattern was recorded after selecting respective optimal recording powers.

Jitters were measured using Limit EQ, a signal processing technology used for evaluation of recording properties of a Blu-Ray Disc, and therefore recording was performed on the same five tracks 10 times, and the middle track was evaluated.

Furthermore, random SER, the reproducing error was measured by repeatedly recording (DOW 10) on 400 tracks 10 times at each recording linear velocity, the recorded part was reproduced with a reproducing power of 0.30 mW and a linear velocity of 4.9 m/s. The results were given in the following.

| Linear velocity | jitter | Random SER |
|---|---|---|
| 4.9 m/s | 5.5% | $3.5 \times 10^{-5}$ |
| 9.8 m/s | 4.3% | $9.5 \times 10^{-6}$ |
| 19.6 m/s | 4.9% | $1.8 \times 10^{-5}$ |

The above values were sufficiently favorable values in practical use as Blu-Ray Discs and it was demonstrated that the effect of the present invention was also obtainable with the configuration of the optical recording medium of the Example.

Examples C-1 to C-26 and Comparative Examples C-1 to C-12

A phase-changeable optical recording medium having a layer composition shown in FIG. 6 was produced as follows.

A first protective layer 2 of ZnS—$SiO_2$ (80 mol %:20 mol %) having a thickness of 60 nm, a recording layer 3 of a phase-change material having the composition shown in the following Table C1 and Table C2 having a thickness of 14 nm, a second protective layer 4 of ZnO—Al—Mn (78% by mass: 2% by mass:20% by mass) having a thickness of 11 nm, and a reflective layer 5 composed of Ag having a thickness of 200 nm were sequentially formed onto a polycarbonate substrate 1 with a diameter of 120 mm, a thickness of 0.6 mm with a guide groove formed thereon with a pitch of 0.74 μm, a groove width (at concave portion) of 0.3 μm, and a groove depth of 30 nm.

RF magnetron sputtering method was used for forming a first protective layer 2, and DC magnetron sputtering method was used for forming a recording layer 3, a second protective layer 4, and a reflective layer 5.

Then, applying a UV curable resin onto a reflective layer 5 to form an environment-resistance protective layer 6 and lastly, a substrate (not shown in FIG) similar to the substrate 1 was laminated, thereby optical recording medium having a thickness of 1.2 mm were obtained.

Subsequently, optical disks were initialized by means of an initialization apparatus (manufactured by Hitachi Capital Corporation, POP 120-7 AH) having a laser head equipped with a focusing function for a laser beam having an output wavelength of 830 nm, a width of 1 μm, a length of 75 μm, and a maximum output of 2 W.

The optical recording media were evaluated as to recording properties using a DVD evaluation apparatus (manufactured by Pulstec Industrial Co., Ltd., DDU-1000) having an optical pick-up with a wavelength of 660 nm and a numerical aperture NA of 0.65.

A 2T write strategy was used for recording strategy, and for the pulse width, the writing power, and the erasing power, optimum conditions were used.

A random pattern was recorded according to EFM+ modulation mode on the same five tracks 10 times at respective recording linear velocities of DVD 3.3x-speed (11.5 m/s), DVD 6x-speed (21 m/s), DVD 8x-speed (28 m/s), DVD 12x-speed (42 m/s), and DVD 16x-speed (56 m/s) and the middle track was evaluated.

[Evaluation Criteria]

A: Jitter σ/Tw was 10% or less

B: Jitter σ/Tw was more than 10%

PI error i.e. the reproducing error was measured by repeatedly recording (DOW 10) on 400 tracks 10 times at each recording linear velocity, and the recorded part was reproduced at 1x-speed.

As a reproducing apparatus, an optical disk evaluation apparatus (manufactured by Pulstec Industrial Co., Ltd., DDU-1000) having a pick-up with a wavelength of 650 nm and a lens NA of 0.6 was used, and the optical recording medium was evaluated with reproducing light power of 0.7 mW.

[Evaluation Criteria]

A: the number of reproducing errors (PI errors) was 100 or less

B: the number of reproducing errors (PI errors) was 200 or less

C: the number of reproducing errors (PI errors) was 300 or less

D: the number of reproducing errors (PI errors) was more than 300

The evaluation results were given in Table C1 and Table C2.

TABLE C1

| | Mn | Sb | Sn | Ge | Te | In | Zn | Bi | Jitter 3.3x-speed | Jitter 6x-speed | Jitter 8x-speed | Jitter 12x-speed | Jitter 16x-speed | PI Error 3.3x-speed | PI Error 6x-speed | PI Error 8x-speed | PI Error 12x-speed | PI Error 16x-speed |
|---|---|---|---|---|---|---|---|---|---|---|---|---|---|---|---|---|---|---|
| Comparative Example C-1 | 0.03 | 0.70 | 0.17 | 0.10 | — | — | — | — | B | B | A | A | A | C | D | A | B | B |
| Example C-1 | 0.04 | 0.70 | 0.17 | 0.09 | — | — | — | — | A | A | A | A | A | A | A | A | A | A |
| Example C-2 | 0.09 | 0.70 | 0.17 | 0.04 | — | — | — | — | A | A | A | A | A | A | A | A | A | A |
| Comparative Example C-2 | 0.10 | 0.70 | 0.17 | 0.03 | — | — | — | — | A | B | B | A | A | B | C | C | B | B |
| Comparative Example C-3 | 0.06 | 0.55 | 0.29 | 0.10 | — | — | — | — | A | A | B | B | B | A | A | C | D | D |
| Example C-3 | 0.06 | 0.56 | 0.28 | 0.10 | — | — | — | — | A | A | A | A | A | A | A | B | B | B |
| Example C-4 | 0.05 | 0.79 | 0.06 | 0.10 | — | — | — | — | A | A | A | A | A | A | A | A | A | A |
| Comparative Example C-4 | 0.05 | 0.80 | 0.05 | 0.10 | — | — | — | — | A | A | A | B | B | A | A | B | C | C |
| Comparative Example C-5 | 0.04 | 0.56 | 0.30 | 0.10 | — | — | — | — | B | B | A | A | A | C | D | A | A | A |
| Example C-5 | 0.04 | 0.57 | 0.29 | 0.10 | — | — | — | — | A | A | A | A | A | A | A | A | A | A |
| Example C-6 | 0.04 | 0.79 | 0.05 | 0.12 | — | — | — | — | A | A | A | A | A | A | A | A | A | A |
| Comparative Example C-6 | 0.05 | 0.79 | 0.04 | 0.12 | — | — | — | — | A | A | B | B | B | A | B | C | D | D |
| Comparative Example C-7 | 0.08 | 0.70 | 0.20 | 0.02 | — | — | — | — | B | A | A | A | A | D | A | B | C | C |
| Example C-7 | 0.07 | 0.70 | 0.20 | 0.03 | — | — | — | — | A | A | A | A | A | A | A | A | A | A |
| Example C-8 | 0.04 | 0.61 | 0.12 | 0.23 | — | — | — | — | A | A | A | A | A | A | A | A | A | A |
| Comparative Example C-8 | 0.04 | 0.61 | 0.11 | 0.24 | — | — | — | — | A | A | B | B | B | A | A | D | D | D |
| Example C-9 | 0.06 | 0.69 | 0.14 | 0.10 | 0.01 | — | — | — | A | A | A | A | A | A | A | A | A | A |
| Example C-10 | 0.05 | 0.69 | 0.14 | 0.10 | 0.02 | — | — | — | A | A | A | A | A | A | A | A | A | A |
| Example C-11 | 0.04 | 0.69 | 0.14 | 0.04 | 0.09 | — | — | — | A | A | A | A | A | A | A | A | A | A |
| Comparative Example C-9 | 0.04 | 0.69 | 0.14 | 0.03 | 0.10 | — | — | — | A | A | B | B | B | A | A | A | A | A |

TABLE C2

| | Mn | Sb | Sn | Ge | Te | In | Zn | Bi | Jitter 3.3x-speed | Jitter 6x-speed | Jitter 8x-speed | Jitter 12x-speed | Jitter 16x-speed | PI Error 3.3x-speed | PI Error 6x-speed | PI Error 8x-speed | PI Error 12x-speed | PI Error 16x-speed |
|---|---|---|---|---|---|---|---|---|---|---|---|---|---|---|---|---|---|---|
| Example C-12 | 0.06 | 0.69 | 0.14 | 0.10 | — | 0.01 | — | — | A | A | A | A | A | A | A | A | A | A |
| Example C-13 | 0.05 | 0.69 | 0.14 | 0.10 | — | 0.02 | — | — | A | A | A | A | A | A | A | A | A | A |
| Example C-14 | 0.04 | 0.69 | 0.14 | 0.04 | — | 0.09 | — | — | A | A | A | A | A | A | A | A | A | A |
| Comparative Example C-10 | 0.04 | 0.69 | 0.14 | 0.03 | — | 0.10 | — | — | B | A | A | A | A | B | D | B | A | A |
| Example C-15 | 0.06 | 0.69 | 0.14 | 0.10 | — | — | 0.01 | — | A | A | A | A | A | A | A | A | A | A |
| Example C-16 | 0.05 | 0.69 | 0.14 | 0.10 | — | — | 0.02 | — | A | A | A | A | A | A | A | A | A | A |
| Example C-17 | 0.04 | 0.69 | 0.14 | 0.04 | — | — | 0.09 | — | A | A | A | A | A | A | A | A | A | A |
| Comparative Example C-11 | 0.04 | 0.69 | 0.14 | 0.03 | — | — | 0.10 | — | A | A | B | B | B | A | A | C | D | D |
| Example C-18 | 0.06 | 0.69 | 0.14 | 0.10 | — | — | — | 0.01 | A | A | A | A | A | A | A | A | A | A |
| Example C-19 | 0.05 | 0.69 | 0.14 | 0.10 | — | — | — | 0.02 | A | A | A | A | A | A | A | A | A | A |
| Example C-20 | 0.04 | 0.69 | 0.14 | 0.04 | — | — | — | 0.09 | A | A | A | A | A | A | A | A | A | A |
| Comparative Example C-12 | 0.04 | 0.69 | 0.14 | 0.03 | — | — | — | 0.10 | A | A | B | B | B | A | A | B | C | C |
| Example C-21 | 0.05 | 0.69 | 0.14 | 0.10 | 0.01 | 0.01 | — | — | A | A | A | A | A | A | A | A | A | A |
| Example C-22 | 0.05 | 0.69 | 0.14 | 0.10 | 0.01 | — | 0.01 | — | A | A | A | A | A | A | A | A | A | A |
| Example C-23 | 0.05 | 0.69 | 0.14 | 0.10 | 0.01 | — | — | 0.01 | A | A | A | A | A | A | A | A | A | A |
| Example C-24 | 0.05 | 0.69 | 0.14 | 0.10 | — | 0.01 | 0.01 | — | A | A | A | A | A | A | A | A | A | A |

TABLE C2-continued

| | Mn | Sb | Sn | Ge | Te | In | Zn | Bi | Jitter 3.3x-speed | Jitter 6x-speed | Jitter 8x-speed | Jitter 12x-speed | Jitter 16x-speed | PI Error 3.3x-speed | PI Error 6x-speed | PI Error 8x-speed | PI Error 12x-speed | PI Error 16x-speed |
|---|---|---|---|---|---|---|---|---|---|---|---|---|---|---|---|---|---|---|
| Example C-25 | 0.05 | 0.69 | 0.14 | 0.10 | — | 0.01 | — | 0.01 | A | A | A | A | A | A | A | A | A | A |
| Example C-26 | 0.05 | 0.69 | 0.14 | 0.10 | — | — | 0.01 | 0.01 | A | A | A | A | A | A | A | A | A | A |

From the results shown in Table C1 and Table C2, it was found that optical recording media of Examples C-1 to C-26 enabled high-speed recording, could have downward compatibility, and both PI Error and jitter property could be lowered in a wide linear velocity range.

Then, the optical recording media of Example C-9 and Example C-10 were stored at a temperature of 80° C. and a relative humidity of 85% for 100 hours. Thereafter, the random pattern was recorded on optical recording media of Example C-9 and Example C-10 in a similar recording method, the results were shown in Table C1 and Table C2, and it was found that the optical recording medium of Example C-10 showed excellent results on both jitter and PI error for each linear velocity.

Then, comparing an optimum writing power of optical recording media of Example C-12, Example C-13, Example C-15, Example C-16, Example C-18, and Example C-19, it was found that Example C-13, Example C-16, and Example C-19 had 2 mW to 3 mW lower than the corresponding Example C-12, Example C-15, and Example C-18 and showed more excellent recording sensitivity.

Comparative Example C-13

An optical recording medium was produced similarly to that in Example C-1 except that a material of a second protective layer 4 was changed to ZnS—SiO$_2$ (80 mol %:20 mol %), which is often used in related arts, the thickness was changed to 7 nm, and an interface layer having a thickness of 4 nm was formed, which was composed of TiC and TiO$_2$ at a mass ratio of 7:3 in between the both layers such that the sulfur component in the second protective layer did not affect Ag in the reflective layer.

As a result, jitters of the disk at 3.3x-speed to 8x-speed were evaluated as B, whereas jitters at 12x-speed and 16x-speed were evaluated as D, PI error of the disk at 3.3x-speed and 8x-speed were evaluated as A, whereas PI error at 6x-speed, 12x-speed, and 16x-speed were evaluated as D.

Example C-27 to C-32

Optical recording media were produced and evaluated in the same manner as in Example C-1 except that materials of a second protective layer 4 were changed to shown in the following Table C3. The unit of values shown in material columns in Table C3 is % by mass. The results were given in Table C3.

TABLE C3

| | In$_2$O$_3$ | ZnO | SnO$_2$ | Jitter 3.3x-speed | Jitter 6x-speed | Jitter 8x-speed | Jitter 12x-speed | PI Error 3.3x-speed | PI Error 6x-speed | PI Error 8x-speed | PI Error 12x-speed |
|---|---|---|---|---|---|---|---|---|---|---|---|
| Example C-27 | 100 | | | A | A | A | A | A | B | A | A |
| Example C-28 | | 100 | | A | A | A | A | B | B | A | A |
| Example C-29 | | | 100 | A | A | A | A | A | B | A | B |
| Example C-30 | 90 | | 10 | A | A | A | A | A | B | A | A |
| Example C-31 | 90 | 10 | | A | A | A | A | A | B | A | A |
| Example C-32 | | 90 | 10 | A | A | A | A | B | B | A | A |

From the results shown in Table C3, it was found that optical recording media of Example C-27 to C-32 enabled high-speed recording, and both PI error and jitter property could be lowered in a wide linear velocity range.

Example C-33 to C-38

Optical recording media were produced and evaluated in the same manner as in Example C-31 except that resistance was changed by adding oxygen during sputter forming of a second protective layer 4 and controlling the amount of oxygen.

Resistance was measured using a four-terminal method that was generally used forming a single-layer film of a second protective layer 4 onto a polycarbonate substrate. The results were given in Table C4 with Example C-31.

TABLE C4

| | Resistivity (Ω·cm) | Jitter 3.3x-speed | Jitter 6x-speed | Jitter 8x-speed | Jitter 12x-speed | Jitter 16x-speed | PI Error 3.3x-speed | PI Error 6x-speed | PI Error 8x-speed | PI Error 12x-speed | PI Error 16x-speed |
|---|---|---|---|---|---|---|---|---|---|---|---|
| Example C-31 | $5.5 \times 10^{-4}$ | A | A | A | A | AA | A | B | A | A | A |
| Example C-33 | $1.0 \times 10^{-4}$ | A | A | A | A | A | A | B | A | A | B |

TABLE C4-continued

|  | Resistivity ($\Omega \cdot cm$) | Jitter | | | | | PI Error | | | | |
| --- | --- | --- | --- | --- | --- | --- | --- | --- | --- | --- | --- |
|  |  | 3.3x-speed | 6x-speed | 8x-speed | 12x-speed | 16x-speed | 3.3x-speed | 6x-speed | 8x-speed | 12x-speed | 16x-speed |
| Example C-34 | $1.2 \times 10^{-3}$ | A | A | A | A | A | A | B | A | A | B |
| Example C-35 | $1.8 \times 10^{-2}$ | A | A | A | A | A | A | B | A | A | B |
| Example C-36 | $2.6 \times 10^{-1}$ | A | A | A | A | A | A | B | A | A | B |
| Example C-37 | $9.8 \times 10^{0}$ | A | A | A | A | A | B | B | A | B | B |
| Example C-38 | $1.0 \times 10^{1}$ | A | A | A | A | A | B | B | B | B | B |

From the results shown in Table C4, it was found that high-speed recording was enabled, downward compatibility could be covered, and both PI error and jitter property could be lowered in a wide linear velocity range when the resistivity of a second protective layer was in the range of $1.0 \times 10^{-4}$ $\Omega \cdot cm$ to $1.0 \times 10^{1}$ $\Omega \cdot cm$.

Examples C-39 to C-52 and Comparative Examples C-14 to C-18

Optical recording media were produced and evaluated in the same manner as in Example C-1 except that a material of a second protective layer 4 was changed to the one shown in the following Table C-5. The unit of the values shown in material columns in the Table is % by mass. The results were given in Table C5.

TABLE C5

|  | ZnO | Al | Mn | Ge | Ti | Jitter | | | | | PI Error | | | | |
| --- | --- | --- | --- | --- | --- | --- | --- | --- | --- | --- | --- | --- | --- | --- | --- |
|  |  |  |  |  |  | 3.3x-speed | 6x-speed | 8x-speed | 12x-speed | 16x-speed | 3.3x-speed | 6x-speed | 8x-speed | 12x-speed | 16x-speed |
| Example C-39 | 99.5 | 0.5 |  |  |  | A | A | A | A | A | B | B | A | A | A |
| Example C-40 | 99.0 | 1.0 |  |  |  | A | A | A | A | A | A | B | A | A | A |
| Example C-41 | 98.0 | 2.0 |  |  |  | A | A | A | A | A | A | A | A | A | A |
| Example C-42 | 95.0 | 5.0 |  |  |  | A | A | A | A | A | A | A | A | A | A |
| Example C-43 | 91.0 | 9.0 |  |  |  | A | A | A | A | A | A | B | A | A | A |
| Example C-44 | 90.0 | 10.0 |  |  |  | A | A | A | A | A | B | B | A | A | A |
| Example C-45 | 93.0 | 2.0 | 5.0 |  |  | A | A | A | A | A | A | A | A | A | A |
| Example C-46 | 88.0 | 2.0 | 10.0 |  |  | A | A | A | A | A | A | A | A | A | A |
| Example C-47 | 73.0 | 2.0 | 25.0 |  |  | A | A | A | A | A | A | A | A | B | B |
| Comparative Example C-14 | 72.0 | 2.0 | 26.0 |  |  | A | A | A | A | A | A | A | A | B | D |
| Example C-48 | 93.0 | 2.0 |  | 5.0 |  | A | A | A | A | A | A | A | A | A | A |
| Example C-49 | 73.0 | 2.0 |  | 25.0 |  | A | A | A | A | A | A | A | A | A | A |
| Comparative Example C-15 | 72.0 | 2.0 |  | 26.0 |  | A | A | A | A | A | A | A | A | C | D |
| Example C-50 | 93.0 | 2.0 |  |  | 5.0 | A | A | A | A | A | A | A | A | A | A |
| Example C-51 | 73.0 | 2.0 |  |  | 25.0 | A | A | A | A | A | A | A | A | A | A |
| Comparative Example C-16 | 72.0 | 2.0 |  |  | 26.0 | A | A | A | A | B | A | A | A | C | D |
| Example C-52 | 83.0 | 2.0 | 5.0 | 5.0 | 5.0 | A | A | A | A | A | A | A | A | A | A |
| Comparative Example C-17 | 99.6 | 0.4 |  |  |  | A | A | A | A | B | A | B | B | C | D |
| Comparative Example C-18 | 89.0 | 11.0 |  |  |  | A | A | A | A | B | A | C | A | A | D |

From the results shown in Table C5, it was found that when a material represented by the following Composition Formula (2) was used for a second protective layer, high-speed recording was enabled, downward compatibility could be covered, and both PI error and jitter property could be lowered in a wide linear velocity range.

$$ZnO\text{—}Al\text{—}Y[(100-\alpha 4-\beta 4):\alpha 4:\beta 4] \qquad \text{Composition Formula (2)}$$

where Y is at least one selected from Mn, Ge, and Ti; $\alpha 4$ and $\beta 4$ respectively represent a percent by mass, where $0.5 \leq \alpha 4 \leq 10.0$, and $0 \leq \beta 4 \leq 25.0$.

Examples C-53 to C-67 and Comparative Examples C-19 to C-23

Optical recording media were produced and evaluated in the same manner as in Example C1 except that a material of a second protective layer 4 was changed to the one shown in the following Table C6. The unit of values shown in material columns in Table C6 is % by mass. The results were given in Table C6.

TABLE C6

|  | ZnO | $Al_2O_3$ | $MnO_2$ | $GeO_2$ | $TiO_2$ | Jitter | | | | | PI Error | | | | |
| --- | --- | --- | --- | --- | --- | --- | --- | --- | --- | --- | --- | --- | --- | --- | --- |
|  |  |  |  |  |  | 3.3x-speed | 6x-speed | 8x-speed | 12x-speed | 16x-speed | 3.3x-speed | 6x-speed | 8x-speed | 12x-speed | 16x-speed |
| Example C-53 | 99.5 | 0.5 |  |  |  | A | A | A | A | A | B | B | A | A | A |
| Example C-54 | 99.0 | 1.0 |  |  |  | A | A | A | A | A | A | B | A | A | A |
| Example C-55 | 98.0 | 2.0 |  |  |  | A | A | A | A | A | A | A | A | A | A |

TABLE C6-continued

|  | ZnO | Al$_2$O$_3$ | MnO$_2$ | GeO$_2$ | TiO$_2$ | Jitter 3.3x-speed | 6x-speed | 8x-speed | 12x-speed | 16x-speed | PI Error 3.3x-speed | 6x-speed | 8x-speed | 12x-speed | 16x-speed |
|---|---|---|---|---|---|---|---|---|---|---|---|---|---|---|---|
| Example C-56 | 95.0 | 5.0 | | | | A | A | A | A | A | A | A | A | A | A |
| Example C-57 | 91.0 | 9.0 | | | | A | A | A | A | A | A | B | A | A | A |
| Example C-58 | 90.0 | 10.0 | | | | A | A | A | A | A | B | B | A | A | A |
| Example C-59 | 93.0 | 2.0 | 5.0 | | | A | A | A | A | A | A | A | A | A | A |
| Example C-60 | 88.0 | 2.0 | 10.0 | | | A | A | A | A | A | A | A | A | A | A |
| Example C-61 | 73.0 | 2.0 | 25.0 | | | A | A | A | A | A | A | A | A | A | A |
| Example C-62 | 68.0 | 2.0 | 30.0 | | | A | A | A | A | A | A | A | A | B | B |
| Comparative Example C-19 | 67.0 | 5.0 | 31.0 | | | A | A | A | B | B | A | A | A | C | D |
| Example C-63 | 93.0 | 2.0 | | 5.0 | | A | A | A | A | A | A | A | A | A | A |
| Example C-64 | 68.0 | 2.0 | | 30.0 | | A | A | A | A | A | A | A | A | B | B |
| Comparative Example C-20 | 67.0 | 5.0 | | 31.0 | | A | A | A | B | B | A | A | A | C | D |
| Example C-65 | 93.0 | 2.0 | | | 5.0 | A | A | A | A | A | A | A | A | A | A |
| Example C-66 | 68.0 | 2.0 | | | 30.0 | A | A | A | A | A | A | A | A | B | B |
| Comparative Example C-21 | 67.0 | 5.0 | | | 31.0 | A | A | A | B | B | A | A | A | C | D |
| Example C-67 | 68.0 | 2.0 | 10.0 | 10.0 | 10.0 | A | A | A | A | A | A | A | A | A | A |
| Comparative Example C-22 | 99.6 | 0.4 | | | | A | A | A | A | B | A | B | B | B | D |
| Comparative Example C-23 | 89.0 | 11.0 | | | | A | A | A | A | B | A | C | A | A | D |

From the results shown in Table C6, it was found that when the material represented by the following Composition Formula (3) for a second protective layer was employed, high-speed recording was enabled, downward compatibility could be covered, and both PI error and jitter could be lowered in a wide linear velocity range.

ZnO—Al$_2$O$_3$—Z[(100−α5−β5):α5:β5]   Composition Formula (3)

where Z represents any one of an Mn oxide, a Ge oxide, a Ti oxide, and a mixture thereof, α5 and β5 respectively represent a percent by mass, where $0.5 \leq \alpha5 \leq 10.0$, and $0 \leq \beta5 \leq 30.0$.

Example C-68 to C-77

The random pattern was recorded on optical recording media of Examples C-41, C-46, C-50, C-51, C-52, C-55, C-60, C-64, C-66, and C-67 in the same manner as in Examples stated above, and then stored at a temperature of 80° C. and a relative humidity of 85% for 100 hours. These optical recording media were taken as Example C-68 to C-77 respectively and evaluated as to changes in jitter value. The results were given in Table C7.

TABLE C7

| | Jitter Elevation after storage for 100 hrs under 80° C., 85% RH |
|---|---|
| Example C-68 | 3.5 |
| Example C-69 | 0 |
| Example C-70 | 0 |
| Example C-71 | 0 |
| Example C-72 | 0 |
| Example C-73 | 3 |
| Example C-74 | 0 |
| Example C-75 | 0 |
| Example C-76 | 0 |
| Example C-77 | 0 |

From the results shown in Table C7, it was found that Example C-68 to C-77 showed sufficiently favorable results as to archival property in practical use.

Example C-78

A reflective layer of Ag$_{99.5}$Bi$_{0.5}$ (atomic %) having a thickness of 140 nm, a second protective layer composed of ZnO—Al—Mn (78% by mass:2% by mass:20% by mass) having a thickness of 11 nm, a recording layer composed of the same materials shown in Example C-1 having a thickness of 14 nm, and a first protective layer of ZnS—SiO$_2$ (80 mol %:20 mol %) having a thickness of 40 nm were sequentially formed on a polycarbonate substrate having a diameter of 120 mm, thickness of 1.1 mm with a guide groove formed thereon with a pitch of 0.32 μm, a groove width (at concave portion) of 0.2 μm, and a groove depth of 22 nm.

Lastly, an adhesive sheet having a thickness of 75 nm was laminated through a UV curable resin having a thickness of 25 nm to form an optically-transparent layer having a thickness of 0.1 mm; thereby an optical recording medium was produced.

Then, the optical recording medium was initialized similarly to that in Example C-1.

Each of the prepared optical recording media was evaluated as to recording properties using a Blu-Ray Disc evaluation apparatus (manufactured by Pulstec Industrial Co., Ltd., ODU-1000).

The random pattern was recorded using a pick-up head having a wavelength of 405 nm, a lens NA of 0.85 and using modulation mode (1-7) RLL with the shortest mark length of 0.149 μm.

Recording linear velocities were set at 4.9 m/s, 9.8 m/s, and 19.6 m/s, and the random pattern was recorded after selecting respective optimal recording powers.

Jitters were measured using Limit EQ, a signal processing technology used for evaluation of recording properties of a Blu-Ray Disc, and therefore recording was performed on the same five tracks 10 times and the middle track was evaluated.

Furthermore, random SER, the reproducing error was measured by repeatedly recording (DOW 10) on 400 tracks 10 times at each recording linear velocity, the recorded part was reproduced with a reproducing power of 0.30 mW and a linear velocity of 4.9 m/s. The results were given in the following.

| Linear velocity | jitter | Random SER |
| --- | --- | --- |
| 4.9 m/s | 5.8% | $5.0 \times 10^{-5}$ |
| 9.8 m/s | 4.6% | $1.1 \times 10^{-5}$ |
| 19.6 m/s | 5.2% | $2.1 \times 10^{-5}$ |

The above values were sufficiently favorable values in practical use as Blu-Ray Discs, and it was demonstrated that the effect of the present invention was also obtainable with the configuration of the optical recording medium in the Example.

INDUSTRIAL APPLICABILITY

An optical recording medium of the present invention is preferably used for high density recordable optical recording media having a recording layer such as DVD+RW, DVD-RW, BD-RE, HD-DVD-RW, for example

The invention claimed is:

1. An optical recording medium comprising:
   a first protective layer,
   a recording layer,
   a second protective layer, and
   a reflective layer formed in this order as viewed from the side of laser beam irradiation for recording and reproducing
   wherein, the recording layer comprises a phase-change material represented by any one of the following Composition Formula (1-1), Composition Formula (1-2), and Composition Formula (1-3); and the second protective layer comprises at least one selected from a material represented by the following Composition Formula (2), and a material represented by the following Composition Formula (3), $$\text{In}_{\alpha 1}\text{Sb}_{\beta 1}\text{X1}_{\gamma 1} \quad \text{Composition Formula (1-1)}$$

where X1 is at least one selected from Ge, Te, Zn, and Mn; $\alpha 1$, $\beta 1$, and $\gamma 1$ respectively represent an atomic ratio, where $0.10 \leq \alpha 1 \leq 0.25$, $0.65 \leq \beta 1 \leq 0.80$, and $0.04 \leq \gamma 1 \leq 0.15$, $$\text{Ga}_{\alpha 2}\text{Sb}_{\beta 2}\text{Sn}_{\gamma 2}\text{Ge}_{\delta 2}\text{X2}_{\in 2} \quad \text{Composition Formula (1-2)}$$

where X2 is at least one selected from Te, Zn, Mn, and In; $\alpha 2$, $\beta 2$, $\gamma 2$, $\delta 2$, and $\in 2$ respectively represent an atomic ratio, where $0.04 \leq \alpha 2 \leq 0.09$, $0.56 \leq \beta 2 \leq 0.79$, $0.05 \leq \gamma 2 \leq 0.30$, $0.03 \leq \delta 2 \leq 0.19$, and $0 \leq \in 2 \leq 0.09$, $$\text{Mn}_{\alpha 3}\text{Sb}_{\beta 3}\text{Sn}_{\gamma 3}\text{Ge}_{\delta 3}\text{X3}_{\in 3} \quad \text{Composition Formula (1-3)}$$

where X3 is at least one selected from Te, In, Zn, and Bi; $\alpha 3$, $\beta 3$, $\gamma 3$, $\delta 3$, and $\in 3$ respectively represent an atomic ratio, where $0.04 \leq \alpha 3 \leq 0.09$, $0.56 \leq \beta 3 \leq 0.79$, $0.05 \leq \gamma 3 \leq 0.29$, $0.03 \leq \delta 3 \leq 0.23$, and $0 \leq \in 3 \leq 0.09$, $$\text{ZnO—Al—Y}[(100-\alpha 4-\beta 4):\alpha 4:\beta 4] \quad \text{Composition Formula (2)}$$

where Y is at least one selected from Mn, Ge, and Ti; $\alpha 4$ and $\beta 4$ respectively represent a percent by mass, where $0.5 \leq \alpha 4 \leq 10.0$, and $0 \leq \beta 4 \leq 25.0$, $$\text{ZnO—Al}_2\text{O}_3\text{—Z}[(100-\alpha 5-\beta 5):\alpha 5:\beta 5] \quad \text{Composition Formula (3)}$$

where Z represents any one of an Mn oxide, a Ge oxide, a Ti oxide, and a mixture thereof; $\alpha 5$ and $\beta 5$ respectively represent a percent by mass, where $0.5 \leq \alpha 5 \leq 10.0$, and $0 \leq \beta 5 \leq 30.0$.

2. The optical recording medium according to claim 1, further comprising a transparent substrate, wherein at least the first protective layer, the recording layer, the second protective layer and the reflective layer are formed in this order on the transparent substrate as viewed from the side of laser beam irradiation for recording and reproducing.

3. The optical recording medium according to claim 1, further comprising a transparent cover layer, wherein the transparent cover layer, the first protective layer, the recording layer, the second protective layer, and the reflective layer are formed in this order on the substrate as viewed from the side of laser beam irradiation for recording and reproducing.

4. The optical recording medium according to claim 1, wherein the recording layer comprises a phase-change material represented by the following Composition Formula (1-1); and the second protective layer comprises a material represented by the following Composition Formula (2), $$\text{In}_{\alpha 1}\text{Sb}_{\beta 1}\text{X1}_{\gamma 1} \quad \text{Composition Formula (1-1)}$$

where X1 is at least one selected from Ge, Te, Zn, and Mn; $\alpha 1$, $\beta 1$, and $\gamma 1$ respectively represent an atomic ratio, where $0.10 \leq \alpha 1 \leq 0.25$, $0.65 \leq \beta 1 \leq 0.80$, and $0.04 \leq \gamma 1 \leq 0.15$, $$\text{ZnO—Al—Y}[(100-\alpha 4-\beta 4):\alpha 4:\beta 4] \quad \text{Composition Formula (2)}$$

where Y is at least one selected from Mn, Ge, and Ti; $\alpha 4$ and $\beta 4$ respectively represent a percent by mass, where $0.5 \leq \alpha 4 \leq 10.0$, and $0 \leq \beta 4 \leq 25.0$.

5. The optical recording medium according to claim 1, wherein the recording layer comprises a phase-change material represented by the following Composition Formula (1-1) and the second protective layer comprises a material represented by the following Composition Formula (3), $$\text{In}_{\alpha 1}\text{Sb}_{\beta 1}\text{X1}_{\gamma 1} \quad \text{Composition Formula (1-1)}$$

where X1 is at least one selected from Ge, Te, Zn, and Mn; $\alpha 1$, $\beta 1$, and $\gamma 1$ respectively represent an atomic ratio, where $0.10 \leq \alpha 1 \leq 0.25$, $0.65 \leq \beta 1 \leq 0.80$, and $0.04 \leq \gamma 1 \leq 0.15$, $$\text{ZnO—Al}_2\text{O}_3\text{—Z}[(100-\alpha 5-\beta 5):\alpha 5:\beta 5] \quad \text{Composition Formula (3)}$$

where Z represents any one of an Mn oxide, a Ge oxide, a Ti oxide, and a mixture thereof; $\alpha 5$ and $\beta 5$ respectively represent a percent by mass, where $0.5 \leq \alpha 5 \leq 10.0$, and $0 \leq \beta 5 \leq 30.0$.

6. The optical recording medium according to claim 1, wherein the recording layer comprises a phase-change material represented by the following Composition Formula (1-2); and the second protective layer comprises a material represented by the following Composition Formula (2), $$\text{Ga}_{\alpha 2}\text{Sb}_{\beta 2}\text{Sn}_{\gamma 2}\text{Ge}_{\delta 2}\text{X2}_{\in 2} \quad \text{Composition Formula (1-2)}$$

where X2 is at least one selected from Te, Zn, Mn, and In; $\alpha 2$, $\beta 2$, $\gamma 2$, $\delta 2$, and $\in 2$ respectively represent an atomic ratio, where $0.04 \leq \alpha 2 \leq 0.09$, $0.56 \leq \beta 2 \leq 0.79$, $0.05 \leq \gamma 2 \leq 0.30$, $0.03 \leq \delta 2 \leq 0.19$, and $0 \leq \in 2 \leq 0.09$, $$\text{ZnO—Al—Y}[(100-\alpha 4-\beta 4):\alpha 4:\beta 4] \quad \text{Composition Formula (2)}$$

where Y is at least one selected from Mn, Ge, and Ti; $\alpha 4$ and $\beta 4$ respectively represent a percent by mass, where $0.5 \leq \alpha 4 \leq 10.0$, and $0 \leq \beta 4 \leq 25.0$.

7. The optical recording medium according to claim 1, wherein the recording layer comprises a phase-change material represented by the following Composition Formula (1-2); and the second protective layer comprises a material represented by the following Composition Formula (3), $$\text{Ga}_{\alpha 2}\text{Sb}_{\beta 2}\text{Sn}_{\gamma 2}\text{Ge}_{\delta 2}\text{X2}_{\in 2} \quad \text{Composition Formula (1-2)}$$

where X2 is at least one selected from Te, Zn, Mn, and In; $\alpha 2$, $\beta 2$, $\gamma 2$, $\delta 2$, and $\in 2$ respectively represent an atomic ratio, where $0.04 \leq \alpha 2 \leq 0.09$, $0.56 \leq \beta 2 \leq 0.79$, $0.05 \leq \gamma 2 \leq 0.30$, $0.03 \leq \delta 2 \leq 0.19$, and $0 \leq \in 2 \leq 0.09$, $$ZnO\text{—}Al_2O_3\text{—}Z[(100-\alpha 5-\beta 5):\alpha 5:\beta 5] \quad \text{Composition Formula (3)}$$

where Z represents any one of an Mn oxide, a Ge oxide, a Ti oxide, and a mixture thereof; $\alpha 5$ and $\beta 5$ respectively represent a percent by mass, where $0.5 \leq \alpha 5 \leq 10.0$, and $0 \leq \beta 5 \leq 30.0$.

8. The optical recording medium according to claim 1, wherein the recording layer comprises a phase-change material represented by the following Composition Formula (1-3); and the second protective layer comprises a material represented by the following Composition Formula (2), $$Mn_{\alpha 3}Sb_{\beta 3}Sn_{\gamma 3}Ge_{\delta 3}X3_{\in 3} \quad \text{Composition Formula (1-3)}$$

where X3 is at least one selected from Te, In, Zn, and Bi; $\alpha 3$, $\beta 3$, $\gamma 3$, $\delta 3$, and $\in 3$ respectively represent an atomic ratio, where $0.04 \leq \alpha 3 \leq 0.09$, $0.56 \leq \beta 3 \leq 0.79$, $0.05 \leq \gamma 3 \leq 0.29$, $0.03 \leq \delta 3 \leq 0.23$, and $0 \leq \in 3 \leq 0.09$, $$ZnO\text{—}Al\text{—}Y[(100-\alpha 4-\beta 4):\alpha 4:\beta 4] \quad \text{Composition Formula (2)}$$

where Y is at least one selected from Mn, Ge, and Ti; $\alpha 4$ and $\beta 4$ respectively represent a percent by mass, where $0.5 \leq \alpha 4 \leq 10.0$, and $0 \leq \beta 4 \leq 25.0$.

9. The optical recording medium according to claim 1, wherein the recording layer comprises a phase-change material represented by the following Composition Formula (1-3); and the second protective layer comprises a material represented by the following Composition Formula (3), $$Mn_{\alpha 3}Sb_{\beta 3}Sn_{\gamma 3}Ge_{\delta 3}X3_{\in 3} \quad \text{Composition Formula (1-3)}$$

where X3 is at least one selected from Te, In, Zn, and Bi; $\alpha 3$, $\beta 3$, $\gamma 3$, $\delta 3$, and $\in 3$ respectively represent an atomic ratio, where $0.04 \leq \alpha 3 \leq 0.09$, $0.56 \leq \beta 3 \leq 0.79$, $0.05 \leq \gamma 3 \leq 0.29$, $0.03 \leq \delta 3 \leq 0.23$, and $0 \leq \in 3 \leq 0.09$, $$ZnO\text{—}Al_2O_3\text{—}Z[(100-\alpha 5-\beta 5):\alpha 5:\beta 5] \quad \text{Composition Formula (3)}$$

where Z represents any one of an Mn oxide, a Ge oxide, a Ti oxide, and a mixture thereof; $\alpha 5$ and $\beta 5$ respectively represent a percent by mass, where $0.5 \leq \alpha 5 \leq 10.0$, and $0 \leq \beta 5 \leq 30.0$.

10. The optical recording medium according to claim 1, wherein the electric resistivity of the second protective layer is $1.0 \times 10^{-4}$ $\Omega \cdot$cm to $1.0 \times 10^{1}$ $\Omega \cdot$cm.

11. The optical recording medium according to claim 1, wherein the maximum recording linear velocity is 30 m/s to 56 m/s and the minimum recording linear velocity is 10 m/s to 14 m/s.

12. The optical recording medium according to claim 1, wherein the shortest recording mark length is 0.5 μm or less.

\* \* \* \* \*